United States Patent
Christian et al.

(10) Patent No.: US 7,300,722 B2
(45) Date of Patent: *Nov. 27, 2007

(54) LITHIUM BATTERY CONTAINING BISMUTH METAL OXIDE

(75) Inventors: Paul A. Christian, Norton, MA (US); Cahit Eylem, Bellingham, MA (US); Kirakodu S. Nanjundaswamy, Sharon, MA (US); Fan Zhang, Needham, MA (US); Xiandong Wang, Acton, MA (US)

(73) Assignee: The Gillette Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,050

(22) Filed: Apr. 11, 2005

(65) Prior Publication Data

US 2006/0228629 A1    Oct. 12, 2006

(51) Int. Cl.
    *H01M 4/58* (2006.01)
    *H01M 4/40* (2006.01)

(52) U.S. Cl. ............ 429/231.95; 429/218.1; 429/231.1; 429/231.9; 429/231.6

(58) Field of Classification Search .......... 429/231.95, 429/218.1, 231.1, 231.9, 231.6
    See application file for complete search history.

(56) References Cited

U.S. PATENT DOCUMENTS

| | | | |
|---|---|---|---|
| 2,809,225 A * | 10/1957 | Morehouse et al. | ........ 429/188 |
| 2,828,350 A | 3/1958 | Rhyne, Jr. | |
| 3,415,687 A | 12/1968 | Methlie, II | |
| 3,822,148 A | 7/1974 | Dey et al. | |
| 3,853,627 A | 12/1974 | Lehmann et al. | |
| 4,085,259 A | 4/1978 | Lauck | |
| 4,113,929 A | 9/1978 | Margalit | |
| 4,158,723 A * | 6/1979 | Gabano et al. | ............ 429/337 |
| 4,184,016 A | 1/1980 | Lecerf | |
| 4,229,509 A | 10/1980 | Margalit | |
| 4,233,374 A | 11/1980 | Lecerf | |
| 4,268,588 A * | 5/1981 | Lecerf et al. | ............ 429/338 |
| 4,271,243 A | 6/1981 | Broussely et al. | |
| 4,309,491 A | 1/1982 | Brec et al. | |
| 4,444,857 A | 4/1984 | Duchange et al. | |

(Continued)

FOREIGN PATENT DOCUMENTS

EP    0 127 134    12/1984

(Continued)

OTHER PUBLICATIONS

Blasse, "On the structure of some compounds Li3Me5+O4 and some other mixed metal oxides containing lithium,"Zeitschrift fur anorganishe und allegemaeine chemie band 331, pp. 44-51.*

(Continued)

*Primary Examiner*—Patrick Joseph Ryan
*Assistant Examiner*—Angela J. Martin
(74) *Attorney, Agent, or Firm*—Fish & Richardson P.C.

(57) ABSTRACT

A battery includes a cathode having an oxide containing one or more metals and pentavalent bismuth, an anode including lithium, a separator between the cathode and the anode, and an electrolyte. The metal(s) can be an alkali metal, an alkaline earth metal, a transition metal, and/or a main group metal.

30 Claims, 6 Drawing Sheets

U.S. PATENT DOCUMENTS

| | | | |
|---|---|---|---|
| 4,804,597 | A | 2/1989 | Tahara et al. |
| 5,368,957 | A | 11/1994 | Kozmik et al. |
| 5,389,469 | A | 2/1995 | Passaniti et al. |
| 5,589,109 | A | 12/1996 | Passaniti et al. |
| 5,658,688 | A | 8/1997 | Jolson |
| 6,001,508 | A * | 12/1999 | Passaniti et al. ............ 429/219 |
| 2003/0082450 | A1 | 5/2003 | Tanoue et al. |
| 2004/0121235 | A1 | 6/2004 | Amatucci |

FOREIGN PATENT DOCUMENTS

| | | |
|---|---|---|
| GB | 2202670 | 9/1988 |
| JP | 55/111067 | 8/1980 |
| JP | 55111067 * | 8/1980 |
| JP | 56/159067 | 12/1981 |
| JP | 58/001971 | 1/1983 |
| JP | 58/048357 | 3/1983 |
| JP | 04/002020 | 1/1992 |
| JP | 52/12425 | 8/1993 |

OTHER PUBLICATIONS

Kumada et al., "Preparation of ABi2O6" Materials Research Bulletin, 1997, vol. 32, No. 8, pp. 1003-2008.*

Pasquali et al., "Primary 1.5 v lithium cells with vivo4 cathodes," 1989, Journal Power Sources, 27, pp. 29-34.*

Apostolova et al, "Study of bismuth-containing oxide compounds as cathode materials for lithium batteries," Russian Journal of Applied Chemistry, 1999, vol. 72, No. 8, pp. 1377-1380.*

Kumada et al., "Synthesis Of New Ilmenite-Type Oxides, AgMO (M=Sb,Bi) By Ion-Exchange Reaction", Advances in Ion Exchange for Industry and Research, pp. 212-217, 1999.

Mergen et al., "Crystal Chemistry, Thermal Expansion And Dielectric Properties Of $(Bi_{1.5}Zn_{0.5})O_7$ Pyrochlore", Materials Research Bulletin, pp. 175-189, vol. 32, No. 2, Jan. 1997.

Kumada et al., "Crystal Structure of $Bi_2O_4$ with $\beta$-$Sb_2O_4$-Type Structure", Journal of Solid State Technology, pp. 281-285, vol. 116, No. 2, May 1995.

Kinomura et al., "Preparation of Bismuth Oxides with Mixed Valence from Hydrated Sodium Bismuth Oxide", Materials Research Bulletin, pp. 129-134, vol. 30, No. 2, Feb. 1995.

Passaniti et al., "Silver Oxide Cells", Handbook of Batteries, pp. 12.1-12.16, 1995.

Lovrecek et al., "Monographs in Electroanalytical Chemistry and Electrochemistry", Standards Potential in Aqueous Solution, pp. 180-187, 1985.

Muylder et al., "Bismuth", Cebelcor, pp. 534-539, 1957.

Kinoshita, "Properties of Bismuth Oxide as an Active Material of Negative Electrode in Alkaline Storage Cell", Bull. Chem. Soc., Japan, pp. 59-65, 1940.

Sharma et al., Synthesis and characterization of $AgBiO_3$ with the cubic $KSbO_3$ structure, Indian Journal of Chemistry, vol. 43A, pp. 11-17, Jan. 2004.

Bervas et al., "Carbon Bismuth Oxyfluoride Nanocomposites as Cathode Material for Lithium Battery", Abs. 419, 206th Meeting, Electrochemical Society, 2004.

Wang et al., U.S. Appl. No. 10/716,358, "Primary Alkaline Battery Containing Bismuth Metal Oxide", Nov. 17, 2003.

Antipov et al., "The Superconducting Bismuth-based Mixed Oxides", Journal of Low Temperature Physics, vol. 131, Nos. 3/4, May 2003.

Jain et al., "Nanosized Amphorous Iron Oxyhydroxide for Reversible Lithium Intercalation", Journal of the Electrochemical Society, 150, (6), pp. A806-A810, 2003.

Oberndorfer et al., "A New Approach to Silverbusmuthates", Z. Anorg. Allg. Chem., 628, pp. 1951-1954, 2002 (English Abstract Only).

Rodriguez et al., "Electrochemical study of the reaction of lithium with Aurivillius and related phases", Material Research Bulletin, 36, pp. 1195-1204, 2001.

Kumada et al., "Preparation of New Bismuth Oxides by Hydrothermal Reaction", Mat. Res. Soc. Symp. Proc., vol. 658, pp. GG8.71-GG8.76, 2001.

Liu et al.; "Synethesis of superconducting $Ba_{1-x}K_xBiO_3$ by a modified molten salt process", Materials Research Bulletin, 36, pp. 1505-1512, 2001.

Patoux et al., "Lithium- and Proton-Driven Redox Reactions in BIMEVOX-Type Phases", Chem. Mater., 13, 500-7, 2001.

Kumada et al., "Neutron powder diffraction refinement of ilmenite-type bismuth oxides: $ABlO_3$ (A=Na, Ag)", Materials Research Bulletin, 35, pp. 2397-2402, 2000.

Arroyo et al., "From $Bi_4V_2O_{11}$ to $Li_{28}B_4V2O_{11}$ by electrochemical lithium insertion: versatile applications in lithium batteries", International Journal of Inorganic Materials, 1, pp. 83-86, 1999.

Apostolova et al., "Study of Bismuth-containing Oxide Compounds as Cathode Materials for Lithium Batteries", Russian Journal of Applied Chemistry, vol. 72, No. 8, pp. 1377-1380, 1999.

Kumada et al., Ion-exchange reaction of $Na^+$ in $NabiO_3$ $nH_2O$ with $Sr^{2+}$ and $Ba^{2+}$, Solid State Ionics, 122, pp. 183-189, 1999.

Deibele et al., "Bismusth in $Ag_2BiO_3$:Tetravalent or Internally Disproportionated", Journal of Solid State Chemistry, 147, pp. 117-121, 1999.

Kumada et al., "Preparation of $ABi_2O_6$ (A=Mg, Zn) with the Trirutile-type Structure", Materials Research Bulletin, vol. 32, No. 8, pp. 1003-2008, 1997.

Lazure et al., "Composition dependence of oxide anion conduction in the BIMEVOX family", Solid State Ionics, 90, pp. 117-123, 1996 (Abstract only).

Arroyo et al., "$Bi_4V_2O_11$ and related compounds as positive electrode materials for lithium rechargeable batteries", Solid State Ionics, 91, pp. 273-278, 1996.

Kumada et al., "Preparation and Crystal Structure of a New Lithium Bismuth Oxide: $LiBiO_3$", Journal of Solid State Chemistry, 126, pp. 121-126, 1996.

Pasquali et al., "Primary 1.5 Lithium Cells with $ViVO_4$ Cathodes", Journal of Power Sources, 27, pp. 29-34, 1989.

Takeuchi et al., "The Reduction of Silver Vanadium Oxide in Lithium/Silver Vanadium Oxide Cells", J. Electrochem. Soc.: Electrochechemical Science and Technology, vol. 135, No. 11, pp. 2691-2694, 1988.

Pistoia et al., "Button Cells Based on the $Li/Bi_2O_3$ Couple", Journal of Power Sources, 16, pp. 263-269, 1985.

Linden in "Handbook of Batteries and Fuel Cells", Handbook of Batteries and Fuel Cells, pp. 11-79-11-81, 1984.

Broussely et al., "Lithium-Bismuth Metal Oxide Cells", Lithium Batteries, pp. 97-114, 1983.

Trehoux et al., Synthese et Caracterisation de Nouvelles Phases due Diagramme (K Ou Na)—Bi—O, Mat. Res. Bull, vol. 17, pp. 1235-1243, 1982 (French Only).

Cox, "Mixed-Valent $Ba^2Bi^{3+}Bi^{5+}O6$:Structure and Properties vs. Temperature", Acta Cryst., B35, pp. 1-10, 1979.

Murphy et al., "Topochemical Reactions of Rutile Related Structures with Lithium", Mat. Res. Bull. vol. 13, pp. 1395, 1402, 1978.

Blasse, "On the Structure of some Compounds $Li_3Me^5+O_4$ and some other Mixed Metal Oxides Containing Lithium", Zeitschrift fur anorganishe und allegemeine Chemie Band 331, pp. 44-51, 1964.

Scholder et al., "Alkali and alkaline and earth bismuthates", Zeitschrift fur anorganishe und allegemeine Chemie Band 319, pp. 375-386, 1963 (English Abstract Only).

Latimer "The Oxidation States of the Elements and Their Potentials in Aqueous Solutions", 2nd ed., Prentice-Hall, New York, pp. 122-123, 1952.

Scholder et al., "On Bismuthates", Zeitschrift fur anorganishe und allegemeine Chemie 247, pp. 392-415, 1941 (English Translation).

* cited by examiner

LITHIUM BATTERY CONTAINING BISMUTH METAL OXIDE

FIELD OF THE INVENTION

The invention relates to lithium batteries.

BACKGROUND

Batteries, such as lithium batteries, are commonly used as electrical energy sources. Generally, a battery contains a negative electrode (anode) and a positive electrode (cathode). The negative electrode contains an electroactive material (such as lithium metal) that can be oxidized; and the positive electrode contains an electroactive material (such as manganese dioxide) that can be reduced. The active material of the negative electrode is capable of reducing the active material of the positive electrode. In order to prevent direct reaction of the active material of the negative electrode and the active material of the positive electrode, the electrodes are mechanically and electrically isolated from each other by an ion-permeable separator.

When a battery is used as an electrical energy source for a device, such as a cellular telephone, electrical contact is made to the electrodes, allowing electrons to flow through the device and permitting the oxidation and reduction reactions to occur at the respective electrodes to provide electrical power. An electrolyte solution in contact with the electrodes contains ions that diffuse through the separator between the electrodes to maintain electrical charge balance throughout the battery during discharge.

SUMMARY

The invention relates to batteries including bismuth. The batteries can be primary batteries or secondary batteries.

In one aspect, the invention features a battery including a cathode having an oxide containing one or more metals and pentavalent bismuth, an anode including lithium, a separator between the cathode and the anode, and an electrolyte.

In another aspect, the invention features a battery including a cathode having an oxide containing a metal and pentavalent bismuth, an anode, a separator between the cathode and the anode, and a non-aqueous electrolyte. The anode can include, for example, lithium.

In another aspect, the invention features a battery including a cathode having a battery, including a cathode having an oxide containing a metal and pentavalent bismuth, an anode including lithium, a separator between the cathode and the anode, and an electrolyte.

In another aspect, the invention features a method including discharging a battery including a cathode having an oxide containing one or more metals and pentavalent bismuth, an anode including lithium, a separator between the cathode and the anode, and an electrolyte; and disposing the battery without recharging the battery. The electrolyte can be a non-aqueous electrolyte.

In another aspect, the invention features a method including discharging a battery including a cathode having an oxide containing one or more metals and pentavalent bismuth, an anode, a separator between the cathode and the anode, and a non-aqueous electrolyte; and disposing the battery without recharging the battery.

In another aspect, the invention features a method including discharging a battery including a cathode having an oxide containing one or more metals and pentavalent bismuth, an anode including lithium, a separator between the cathode and the anode, and a non-aqueous electrolyte; and recharging the battery.

In another aspect, the invention features a method including discharging a battery including a cathode having an oxide containing one or more metals and pentavalent bismuth, an anode, a separator between the cathode and the anode, and a non-aqueous electrolyte; and recharging the battery.

Aspects of the invention may include one or more of the following features. The metal is an alkali metal, such as lithium, sodium, and/or potassium. The oxide is $LiBiO_3$, $Li_3BiO_4$, $Li_5BiO_5$, $Li_7BiO_6$, $Li_4Bi_2O_7$, $Li_5Bi_3O_{10}$ or $KBiO_3$. The metal is an alkaline earth metal, such as magnesium, calcium, strontium, and/or barium. The oxide is $MgBi_2O_6$, $SrBi_2O_6$, $Sr_2Bi_2O_7$, $LiSr_3BiO_6$, $NaSr_3BiO_6$, $Li_2Ba_2Bi_2O_{11}$, or $Ba_2Bi_2O_6$. The metal is a transition metal, such as scandium, vanadium, chromium, manganese, iron, cobalt, nickel, copper, zinc, silver, yttrium, zirconium, niobium, molybdenum, ruthenium, palladium, cadmium, hafnium, tantalum, and/or tungsten, and the oxide can further include an alkali metal or an alkaline earth metal. The oxide is $ZnBi_2O_6$, $Cu_2Bi_2O_7$, $CdBi_2O_6$, $AgBiO_3$, or $Sr_2ScBiO_6$. The metal is a lanthanide, such as lanthanum, cerium, praseodymium, neodymium, samarium, europium, gadolinium, terbium, dysprosium, holmium, erbium, thulium, and/or ytterbium, and the oxide can further include an alkali metal or an alkaline earth metal. The metal is a main group metal, such as indium, tin, antimony, and/or lead, and the oxide can further include an alkali metal or an alkaline earth metal. The oxide includes an electrically conductive portion, such as an electrically conductive surface coating having carbon or a metal oxide. The electrically conductive surface coating includes a material selected from the group consisting of graphite, carbon black, acetylene black, cobalt oxide, cobalt oxyhydroxide, silver oxide, silver nickel oxide, and indium oxide. The anode includes an alloy having lithium. The electrolyte is non-aqueous. The electrolyte includes a solvent, and a salt that is soluble in the solvent. The battery is a primary battery or a secondary battery.

Embodiments may include one or more of the following advantages. The oxide containing one or more metals and pentavalent bismuth is capable of enhancing overall battery performance, especially at high discharge rates. Electrochemical cells with cathodes including metal oxides containing pentavalent bismuth are capable of providing high energy (e.g., high theoretical volumetric energy densities) and substantial total discharge capacity at commercially useful average running voltages (i.e., closed circuit voltage, CCV). For example, cells having a cathode including a metal oxide containing both trivalent bismuth and pentavalent bismuth in various atomic ratios can exhibit higher average running voltages than certain lithium cells having cathodes including a metal oxide containing only trivalent bismuth. Further, cells having a cathode including a metal oxide containing predominantly pentavalent bismuth can exhibit substantially higher average running voltages than certain lithium cells having cathodes including a metal oxide containing predominantly trivalent bismuth. Cells having a cathode including a metal oxide containing predominantly pentavalent bismuth are capable of having specific discharge capacity between about 3 V and 2 V comparable to or greater than that of heat-treated electrolytic manganese dioxide (i.e., HEMD). The cells can have characteristic discharge voltage profiles including one or more relatively flat plateaus, which may be advantageous for powering certain high-drain digital electronic devices, for example, digital cameras and handheld video games, and electric motor-powered consumer products, for example, powered toothbrushes and razors. Metal oxides containing pentavalent bismuth also are thermally stable and can provide good cathode utilization (e.g., at high or low discharge rates). Cathodes including a metal oxide containing pentavalent bismuth can be incorporated into cylindrical lithium cells of different sizes (e.g., AA, 2/3A, CR2, 18650) as well as into lithium cells having other form-factors, such as coin cells, thin prismatic or flat batteries, and flexible pouch, envelope or bag cells in a cost effective manner. The lithium cell also can be fabricated in the form of spirally wound cell. Many bismuth-containing compounds are known to have low toxicity and benign environmental impact, so the manufacture and disposal of cells having cathodes including metal oxides containing pentavalent bismuth can pose relatively few health and environmental concerns.

Other aspects, features, and advantages of the invention will be apparent from the drawings, description, and claims.

DETAILED DESCRIPTION

Figure 1:
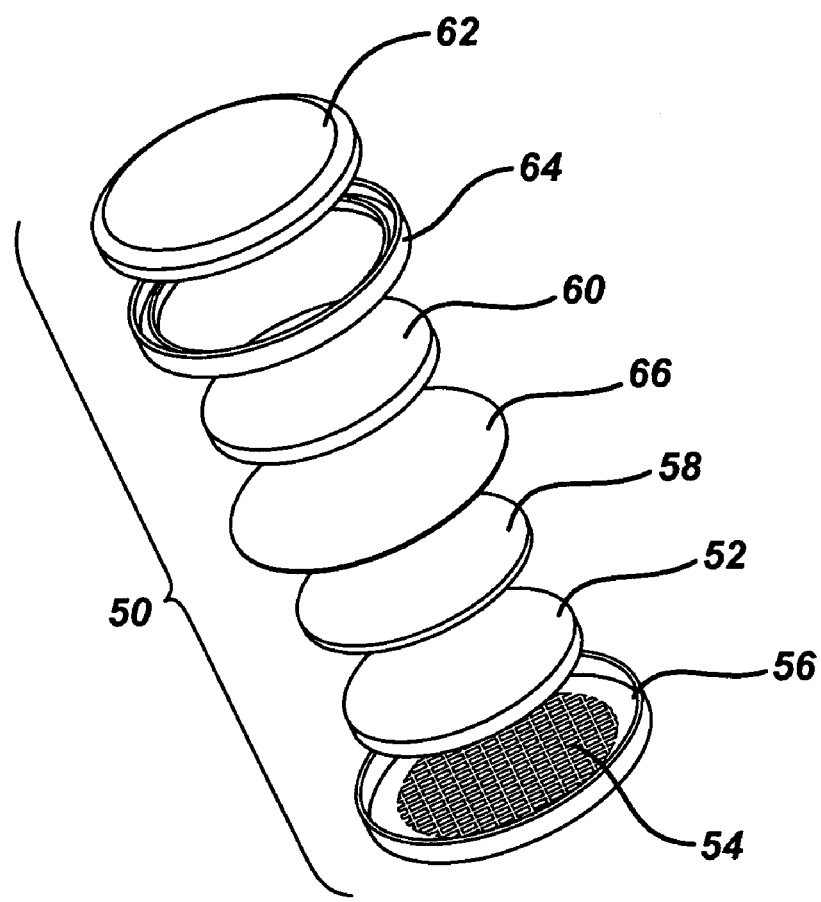
FIG. 1 is an exploded,-perspective view of an embodiment of a lithium coin cell.

Referring to FIG. 1, an electrochemical cell 50 includes an upper cell housing 62, a lower cell housing 56, a cathode 58 in the lower housing, an anode 60 in the upper housing, and a separator 66 positioned between the cathode and the anode. Cell 50 also includes a conductive stage 52 underlying the cathode, a cathode current collector 54, and a seal 64. Upper cell housing 62 serves as the negative terminal for cell 50, and lower cell housing 56 serves as the positive terminal for the cell. An electrolyte solution is distributed throughout cell 50.

Cathode 58 includes a mixture having one or more metal oxides containing pentavalent bismuth, an electrically conductive additive to improve the bulk electrical conductivity of the cathode, and optionally, a binder to improve physical integrity of the cathode.

In particular, the metal oxide containing pentavalent bismuth, commonly called a "bismuthate", is generally a complex oxide containing pentavalent bismuth, i.e., Bi(V), optionally, trivalent bismuth, i.e., Bi(III), as a constituent (e.g., as a minor constituent, such as less than about 50 atomic percent) and one or more other metals. For example, of the bismuth in a chemical formula unit of the complex metal oxide, at least about 50 atomic percent (e.g., more than 50 atomic percent, at least about 60 atomic percent, at least about 70 atomic percent, at least about 80 atomic percent, at least about 90 atomic percent, or 100 atomic percent) is formally pentavalent bismuth. Metal oxides containing pentavalent bismuth are capable of providing cell 50 with high volumetric energy density and a commercially useful average running voltage range (e.g., from about 3.25 to 2 V). The metal oxides containing pentavalent bismuth also can be thermally stable in air to a temperature greater than about 200° C. (e.g., greater than about 300° C.). It is believed that the good thermal stability of metal oxides containing pentavalent bismuth is indicative of the intrinsic structural stability of the crystallographic lattice structure of such oxides as well as chemical stability in the presence of electrolyte and other materials included in the cell. Metal oxides containing pentavalent bismuth can include compounds having a layered or an open framework crystal lattice structure capable of permitting facile insertion of lithium ions. For example, metal oxides containing pentavalent bismuth can have rutile, trirutile, fluorite, pyrochlore, ilmenite, fluorite-related, pyrochlore-related, perovskite-type or other related crystallographic lattice structures. The metal oxides containing pentavalent bismuth can be essentially stoichiometric or non-stoichiometric (i.e., cation deficient or oxygen deficient), and also can contain various other lattice defects. As discussed below, the metal of the metal oxides containing pentavalent bismuth can be an alkali metal, an alkaline earth metal, a transition metal, a lanthanide, a main group metal, or a combination of these metals.

In embodiments in which the metal oxide containing pentavalent bismuth includes an alkali metal, the metal can be lithium, sodium, potassium, rubidium or cesium. Examples of metal oxides containing pentavalent bismuth including an alkali metal include, for example, $MBiO_3$, $M_3BiO_4$, $M_7BiO_6$, $M_4Bi_2O_7$, $M_5Bi_3O_{10}$, where M can be Li, Na, K, Rb, and Cs; $Li_5BiO_5$; and $Li_6KBiO_6$. Syntheses of metal oxides containing an alkali metal and pentavalent bismuth are described, for example, in J. Trehoux et al., *Mater. Res. Bull.*, 17, 1235-43 (1982); E. Nomura et al., *J. Solid State Chem.*, 52, 91-3 (1984); C. Greaves et al., *Mater. Res. Bull.*, 24, 973-980 (1989); S. Kodialam et al., *Mater. Res. Bull.*, 27, 1379-1384 (1992); T. N. Nguyen et al., *Chem. Mater.*, 5(9), 1273-6 (1993); B. K. Kasenov et al., *Zhur. Fiz. Khim.*, 71(6), 1146-8 (1997); and N. Kumada et al., *J. Solid State Chem.*, 126, 121-6 (1996); *Mater. Res. Bull.*, 32(8), 1003-1009 (1997). Any of the metal oxides containing pentavalent bismuth can include more than one type of alkali metal, in any combination, for example, by partial or complete substitution or by ion exchange. Some examples can include $Li_{1-x}Na_xBiO_3$ and $Na_{1-x}K_xBiO_3$, where $0<x<1$; $KLi_6BiO_6$; and $RbLi_6BiO_6$. The metal oxides containing an alkali metal and pentavalent bismuth can be stoichiometric or non-stoichiometric, and can include trivalent bismuth as a minor constituent, e.g., about 50 atomic percent, less than about 50 atomic percent, less than about 30 atomic percent, or less than about 10 atomic percent. Syntheses of metal oxides containing pentavalent bismuth and mixed alkali metals are described, for example, in R. Huebenthal & R. Hoppe, *Acta Chem. Scand.*, 45(8), 805-811 (1991); and V. A. Carlson & A. M. Stacy, *J. Solid State Chem.*, 96, 332-343 (1992).

In embodiments in which the metal oxide containing pentavalent bismuth includes an alkaline earth metal, the metal can be magnesium, calcium, strontium, and barium. Some examples of alkaline metal bismuth oxides include $MgBi_2O_6$, $SrBi_2O_6$, $Sr_2Bi_2O_7$, $LiSr_3BiO_6$, $NaSr_3BiO_6$, $Ba_2Bi_2O_6$ or $Li_2Ba_5Bi_2O_{11}$. Syntheses of metal oxides containing pentavalent bismuth and an alkaline earth metal are described, for example, in K. Kumada et al., *Mater. Res. Bull.*, 32, 1003-8 (1997); K. Kumada et al., *Solid State Ionics*, 122, 183-9(1999); D. E. Cox & A. W. Sleight, *Solid State Commun.*, 19, 969-973 (1976); and O. Knop et al., *Can. J. Chem.*, 58, 2221-4 (1980). In some cases, for example, an alkaline earth bismuth oxides such as perovskite-related $Ba_2Bi_2O_6$, can contain mixed valence bismuth, i.e., having both Bi(V) and Bi(III) present. As with the metal oxides containing pentavalent bismuth and alkali metal, any of the metal oxides containing pentavalent bismuth and an alkaline earth metal can include more than one type of alkaline earth metal or a combination of one or more alkali metals and one or more alkaline earth metals, in any combination. Some examples include $Ba_{1-x}K_xBiO_3$ and $Sr_{1-x}K_xBiO_3$ which also can contain mixed valence bismuth (e.g., for x=0.6, $Ba_{0.6}K_{0.4}BiO_3$), $LiSr_3BiO_6$, and $Li_2Ba_5Bi_2O_{11}$. The alkaline earth bismuth oxides can be stoichiometric or non-stoichiometric, and can include trivalent bismuth as a minor constituent, as described above. Syntheses of mixed alkali metal and alkaline earth metal oxides containing pentavalent bismuth are described, for example, in A. W. Sleight et al., *Solid State Commun.*, 17, 27-8 (1975); *J. Solid State Chem.*, 78, 319 (1989); M. L. Norton, *Mater. Res. Bull.*, 24, 1391-7 (1989); S. F. Liu & W. T. Fu, *Mater. Res. Bull.*, 36, 1505-12(2001); and V. A. Carlson & A. M. Stacy, *J. Solid State Chem.*, 96, 332-343 (1992).

The metal oxide containing pentavalent bismuth can include one or more transition metals and/or one or more main group metals. The transition metal can be a first row transition metal (e.g., Sc, V, Cr, Mn, Fe, Co, Ni, Cu or Zn), a second row transition metal (e.g., Y, Zr, Nb, Mo, Ru, Pd, Ag or Cd) or a third row transition metal (e.g., Hf, Ta, W). Examples of oxides containing pentavalent bismuth and a transition metal include $ZnBi_2O_6$, $AgBiO_3$, $Ag_2BiO_3$, $Ag_{25}Bi_3O_{18}$, $Cu_2Bi_2O_7$, $Ba_2YBiO_6$, $Sr_2ScBiO_6$, $Sr_{18}Ru_{1.9}Bi_{4.1}O_{33}$, and $Li_8PdBi_2O_{10}$. Syntheses of oxides containing pentavalent bismuth and a transition metal are described, for example, in N. Kumada et al., *Mater. Res. Bull.*, 32, 1003-8 (1997); N. Kumada et al., *Adv. Ion-Exchange for Industry Research*, 239, 212-217 (1999); N. Kumada et al., *Mater. Res. Bull.*, 35(2), 2397-2402 (2000); H. Mizoguchi et al., *Chem. Commun.*, (9), 1084-5 (2003); M. Bortz and M. Jansen, *Z. Anorg. Allgem. Chem*, 612, 113-7 (1992); M. S. Martin-Gonzalez et al., *J. Solid State Chem.*, 173, 203-8 (1993); and Y. Laligant and A. LeBail, *Euro. J. Solid State Inorg. Chem.*, 30, 689-698 (1993). The transition metal can be a lanthanide (e.g., La, Ce, Pr, Nd, Sm, Eu, Gd, Tb, Dy, Ho, Er, Tm or Yb). Some examples of metal oxides containing pentavalent bismuth and a lanthanide include $Ba_2LaBiO_6$ and $Sr_2NdBiO_6$. Syntheses of metal oxides containing pentavalent bismuth and a lanthanide are described, for example, in H. Mizoguchi et al., *Chem. Commun.*, (9), 1084-5 (2003); and A. Lenz and H. Mueller-Buschbaum, *J. Less Common Metals*, 161(1), 141-6 (1990). The main group metal can be, for example, Ga, In, Sn, Ti, Pb, As or Sb. Examples of oxides containing pentavalent bismuth and a main group metal include $Ba_2InBiO_6$ and $BaBi_{1-x}Pb_xO_3$. Syntheses of metal oxides containing pentavalent bismuth and a main group metal are described, for example, in W. T. Fu et al., *Mater. Res. Bull.*, 35, 1205 (2000); and A. W. Sleight et al., *Solid State Commun.*, 17, 27 (1975). As with the metal oxides containing pentavalent bismuth described above, the metal oxides containing pentavalent bismuth and a transition metal, lanthanide or main group metal can include more than one type of metal, in any combination. The metal oxides containing pentavalent bismuth and a transition metal, lanthanide or main group metal can be stoichiometric or non-stoichiometric, and can contain mixed valence bismuth, e.g., both Bi(V) and Bi(III) can be present, as described above.

One or more metal oxides containing pentavalent bismuth can make up all of the active material of cathode 58, or a portion of the active material of cathode 58. For example, as the active material of cathode 58, the metal oxide containing pentavalent bismuth can be admixed with nickel oxyhydroxide. The nickel oxyhydroxide can be a beta-nickel oxyhydroxide, a gamma-nickel oxyhydroxide or a cobalt oxyhydroxide-coated nickel oxyhydroxide. The nickel oxyhydroxide can be prepared from a nickel hydroxide via oxidation with ozone as described, for example, in J. Maruta et al., *Electrochemistry*, 71, 1099(2003). Inclusion of metal oxides containing pentavalent bismuth in the cathode of a lithium cell containing nickel oxyhydroxide can enhance the average running voltage and/or the volumetric energy density. In addition, because the metal oxides containing pentavalent bismuth can have substantially higher true densities than nickel oxyhydroxide, the volumetric energy densities of lithium cells with cathodes including metal oxides containing pentavalent bismuth can be greater than that of cells with cathodes containing nickel oxyhydroxide. In some cases, for example, the volumetric energy density of cells with cathodes containing metal oxides containing pentavalent bismuth as additives can be increased substantially compared to cells containing nickel oxyhydroxide as the sole active cathode material. Moreover, the specific capacity of cells with cathodes containing metal oxides containing pentavalent bismuth as additives can be increased because of the formation of metallic Bi from reduction of $Bi_2O_3$ during cell discharge below about 2 V. In a cathode including a combination of active materials, the metal oxide containing pentavalent bismuth can make up from greater than about one percent to less than about 100 percent by weight of the active materials. For example, cathode 58 can include greater than or equal to about 0%, about 10%, about 20%, about 30%, about 40%, about 50%, about 60%, about 70%, about 80%, or about 90% by weight of the metal oxide containing pentavalent bismuth; and/or less than or equal to about 100%, about 90%, about 80%, about 70%, about 60%, about 50%, about 40%, about 30%, about 20%, or about 10% by weight of the metal oxide containing pentavalent bismuth. Other active materials can be included in cathode 58 in combination with the metal oxide containing pentavalent bismuth including, for example, AgO, $Ag_2O$, $AgNiO_2$, and $BaFeO_4$.

The metal oxide containing pentavalent bismuth can be semiconducting, such as $MgBi_2O_6$, $ZnBi_2O_6$, and $Ba_2InBiO_6$, for example. In some embodiments, the metal oxide containing pentavalent bismuth can be a degenerate n-type semiconductor, such as $MgBi_2O_6$ and $ZnBi_2O_6$ as described in H. Mizoguchi et al., *Chem. Commun.*, (9), 1084-5 (2003).

In some embodiments, to enhance its bulk electrical conductivity, the particles of the metal oxide containing pentavalent bismuth can include an electrically conductive portion, e.g., a surface coating that enhances inter-particle electrical conductivity. The conductive surface coating can serve to enhance the discharge capacity and/or the average running voltage of battery 50 (e.g., at low discharge rates), as well as enhance the effective cathode utilization (e.g., at high and low discharge rates). The conductive surface coating can also enhance the chemical stability of the particles of the metal oxide containing pentavalent bismuth in the electrolyte, e.g., by serving as a protective layer during storage at elevated temperatures. The conductive surface coating can include a carbonaceous material, such as graphite (natural or synthetic), carbon black, and/or graphitized black. Additionally or alternatively, the conductive surface coating can include a metal, such as gold or silver, and/or a conductive or a semiconductive metal oxide, such as cobalt oxide (e.g., $Co_3O_4$), cobalt oxyhydroxide, silver oxide, silver bismuth oxide, indium oxide or indium tin oxide. The conductive surface coating can include a nanoparticulate conductive metal oxide. The conductive surface coating also can include one or more optional dopants, for example, sodium. The conductive surface coating can be applied or deposited, for example, using aqueous solution techniques including precipitation and subsequent chemical oxidation, electrodeposition, electroless deposition or by vapor phase deposition (e.g., sputtering, physical vapor deposition, or chemical vapor deposition). A suitable conductive coating thickness can be provided by applying the conductive material at a level of about 2-15 percent by weight (e.g., greater than or equal about 2, about 4, about 6, about 8, about 10, about 12, or about 14 percent by weight, and/or less than or equal to about 15, about 13, about 11, about 9, about 7, about 5, or about 3 percent by weight) relative to the total weight of the metal oxide containing pentavalent bismuth. The conductive layer can cover at least about 60%, at least about 75%, at least about 90% of the surface of the particles of the metal oxide containing pentavalent bismuth.

In some embodiments, cathode 58 includes between about 50 percent and about 95 percent by weight, for example, between about 60 percent and about 90 percent by weight, or between about 70 percent and about 85 percent by weight, of the cathode active material. Cathode 58 can include greater than or equal to about 50, about 60, about 70, about 80, or about 90 percent by weight, and/or less than or equal to about 95, about 90, about 80, about 70, or about 60 percent by weight of the cathode active material. Cathode 58 can include one or more (e.g., two, three or more) of the metal oxides containing pentavalent bismuth, in any combination. For example, cathode 58 can include a mixture of $AgBiO_3$, $MgBi_2O_6$, and/or $ZnBi_2O_6$.

In addition, as indicated above, cathode 58 can include one or more electrically conductive additives capable of enhancing the bulk electrical conductivity of the cathode. Examples of conductive additives include natural or non-synthetic graphite, oxidation-resistant natural or synthetic graphite (e.g., Timrex® SFG-6, available from Timcal America, Inc.), synthetic graphite (e.g., Timrex® KS-6, available from Timcal America, Inc.), oxidation-resistant carbon blacks, including highly graphitized carbon blacks (e.g., MM131, MM179 available from Timcal Belgium N.V.), gold powder, silver oxide, fluorine-doped tin oxide, antimony-doped tin oxide, zinc antimonate, indium tin oxide, cobalt oxides, (e.g., cobalt oxyhydroxide, and/or carbon nanofibers. In certain embodiments, the graphite particles are nonsynthetic, nonexpanded graphite particles (e.g., MP-0702X available from Nacional de Grafite, Itapecirica MG, Brazil). In other embodiments, the graphite particles are synthetic, non-expanded graphite particles, (e.g., Timrex® KS6, KS10, KS15, KS25 available from Timcal, Ltd., Bodio, Switzerland). In other embodiments, the conductive additive is desirably resistant to oxidation by the metal oxide containing pentavalent bismuth, which can have an oxidation potential that is sufficiently high so as to cause oxidation of the conductive additive during storage of the cell, particularly during storage at elevated temperatures. Oxidation of the conductive additive can decrease the bulk conductivity of the cathode and also the total discharge capacity of the cell. Desirably, the conductive additive particles can be oxidation-resistant, synthetic or natural, graphite or highly graphitized carbon black particles.

Mixtures of conductive additives can be used, such as a mixture of graphite particles (e.g., including from about 10 to about 100 weight percent of oxidation-resistant graphite) and carbon nanofibers. Oxidation-resistant synthetic or natural graphites are available from, for example, Timcal, Ltd., Bodio, Switzerland (e.g., Timrex® SFG6, SFG10, SFG15, SFG44, SLP30) or Superior Graphite Co., Chicago, Ill. (e.g., 2939 APH-M). Carbon nanofibers are described, for example, in commonly-assigned U.S. Ser. No. 09/829,709, filed Apr. 10, 2001 and U.S. Pat. No. 6,858,349. Cathode 58 can include from about 10 to about 35 percent by weight of conductive additive. For example, cathode 58 can include greater than or equal to about 10, about 15, about 20, about 25, or about 30 percent by weight of the conductive additive; and/or less than or equal to about 35, about 30, about 25, about 20, or about 15 by weight of the conductive additive.

A binder (e.g., a polymer or co-polymer) can be added to enhance the structural integrity of cathode 58. Examples of binders include polyethylene, polyacrylamides, styrenic block co-polymers (e.g., Kraton™ G), Viton®, and various fluorocarbon resins, including polyvinylidene fluoride (PVDF), polyvinylidene fluoride co-hexafluoropropylene (PVDF-HFP), and polytetrafluoroethylene (PTFE). An example of a polyvinylidene fluoride binder is sold under the tradename Kynar® 741 resin (available from Atofina Chemicals, Inc.). An example of a polyvinylidene fluoride co-hexafluoropropylene binder is sold under the tradename Kynar Flex® 2801 resin (available from Atofina Chemicals, Inc.). An example of a polytetrafluoroethylene binder is sold under the tradename T-60 (available from Dupont). Cathode 58 can include, for example, from about 0.5 percent to about 5 percent (e.g., about 3 percent) by weight of binder.

The electrolyte solution can include one or more solvents and at least one electrolyte salt soluble in the electrolyte solvent. The electrolyte salt can be a lithium salt selected from $LiClO_4$, $LiPF_6$, $LiBF_4$, $LiAsF_6$, $LiCF_3SO_3$, $LiAlCl_4$, $LiN(CF_3SO_2)_2$, $Li(C_4F_9SO_2NCN)$, $LiB(C_2O_4)_2$, and LiB $(C_6H_4O_2)_2$. The concentration of the electrolyte salt in the electrolyte solution can range from about 0.01 M to about 3 M, for example, from about 0.5 to 1.5 M. The electrolyte solvent can be an aprotic organic solvent. Examples of aprotic organic solvents include cyclic carbonates, linear chain carbonates, ethers, cyclic ethers, esters, alkoxyalkanes, nitriles, organic phosphates, and tetrahydrothiophene 1,1-dioxide (i.e., sulfolane). Examples of cyclic carbonates include ethylene carbonate, propylene carbonate, and butylene carbonate. Examples of linear chain carbonates include dimethyl carbonate, diethyl carbonate, ethyl methyl carbonate, and the like. Examples of ethers include diethyl ether and dimethyl ether. Examples of alkoxyalkanes include dimethoxyethane, diethoxyethane, and methoxyethoxyethane. Examples of cyclic ethers include tetrahydrofuran and dioxolane. Examples of esters include methyl acetate, methyl propionate, ethyl propionate, methyl butyrate, and gamma-butyrolactone. An example of a nitrile includes acetonitrile. Examples of organic phosphates include triethylphosphate and trimetylphosphate. The electrolyte can be a polymeric electrolyte. The polymeric electrolyte also can include a solvent. An example of an electrolyte is a solution containing 1 M $LiPF_6$ dissolved in a mixture of ethylene carbonate and diethyl carbonate in a 1:1 ratio by volume. The electrolyte optionally can include an additive such as vinyl ethylene carbonate, vinylene carbonate, and derivatives thereof. Other electrolyte solutions are described in commonly assigned U.S. Ser. Nos. 10/898,469, 10/990,379, 10/085,303, and 10/800,905, all hereby incorporated by reference.

Anode 60 can include an active anode material, usually in the form of an alkali metal (e.g., lithium, sodium, potassium) or an alkaline earth metal (e.g., calcium, magnesium). Anode 60 can include elemental metal (e.g., lithium) or metal alloys, such as an alloy of an alkali metal (e.g., lithium) and an alkaline earth metal (e.g., magnesium) or an alloy of an alkali metal (e.g., lithium) and aluminum (e.g., a lithium aluminum alloy). For example, aluminum can be present in the lithium aluminum alloy at a low concentration, typically less than 1 wt %. Anode 60 can be in the form of, for example, a foil or continuous sheet and can be used with or without a substrate. For example, anode 60 can be formed from an extruded sheet of lithium having a thickness of between about 0.15 and 0.20 mm. The anode also can include an active anode material and a binder. In this case an active anode material can include tin-based materials, carbon-based materials, such as carbon, graphite, an acetylenic mesophase carbon, coke, a metal oxide and/or a lithiated metal oxide. The binder can be, for example, polytetrafluoroethylene, PTFE. The active anode material and binder can be mixed to form a paste which can be applied to the substrate of anode 60.

Separator 66 can be formed from any of the separator materials typically used in lithium primary or secondary cells. Separator 66 can include one or more layers of different separator materials, in any combination. For example, separator 66 can be a thin, porous membrane or film. Separator 66 can have a thickness between about 10 microns and 200 microns, between about 20 microns and 50 microns. The size of the pores in the porous membrane can range from 0.03 microns to 0.2 microns, for example. The porous membrane can include relatively non-reactive polymers such as microporous polypropylene (e.g., Celgard® 3559, Celgard® 5550, Celgard® 5559 or Celgard® 2500), polyethylene, polyamide (i.e., a nylon), polysulfone or polyvinyl chloride. Separator 66 can include a thin non-woven sheet. Separator 66 can include a ceramic or an inorganic membrane.

Battery 50 can be a cylindrical cell (e.g., AA, AAA, 2/3A, CR2, 18650). In other embodiments, battery 50 can be non-cylindrical, such as coin cells, prismatic cells, flat thin cells, bag cells or racetrack shaped cells. Battery 50 can be a spirally wound cell. Battery 50 can be assembled using conventional assembly methods. For example, battery 50 can be a thin coin cell as depicted schematically in FIG. 1. Cathode 58 is positioned in bottom cell housing 56. Separator 66 can be positioned on top of cathode 58. Sufficient electrolyte solution can be added so as to saturate both cathode 58 and separator 66 and completely fill all available volume in bottom cell housing 56. Upper cell housing 62 with annular insulating gasket 64 are positioned in bottom cell housing 56 and battery 50 hermetically sealed by mechanical crimping. Upper cell housing 62 and lower cell housing 56 can be fabricated from metal, for example, stainless steel, cold-rolled steel, nickel plated steel or aluminum.

Battery 50 can be either a primary cell or a secondary or rechargeable cell. Primary electrochemical cells are meant to be discharged completely, e.g., to exhaustion, only once, and then discarded. Primary cells are not intended to be recharged. Primary cells are described, for example, in David Linden, Handbook of Batteries (McGraw-Hill, 2d ed. 1995). Secondary electrochemical cells can be recharged for many times, e.g., more than fifty times, more than a hundred times, or more than five hundred times. In some cases, secondary cells can include relatively robust separators, such as those having multiple layers and/or that are relatively thick. Secondary cells can also be designed to accommodate changes, such as swelling of the electrodes, that can occur during cycling. Secondary cells are described, for example, in D. Linden and T. B. Reddy, ed., Handbook of Batteries (McGraw-Hill, 3$^{rd}$ ed. 2001); J. P. Gabano, ed., Lithium Batteries (Academic Press, 1983); G. A. Nazri and G. Pistoia, ed., Lithium Batteries (Kluwer Academic, 2004).

While a number of embodiments have been described, the invention is not so limited.

For example, in some embodiments, the discharge capacity and running voltage of lithium cells with cathodes including metal oxides containing bismuth(V) can be increased by employing nano-sized particles of the metal oxides containing bismuth(V). For example, decreasing the average particle size of the oxides to nanometer dimensions may enable more efficient cathode utilization in spite of relatively poor electronic conductivity resulting in increased cell discharge capacity. In embodiments, the metal oxides containing bismuth(V) can have an average particle size of less than or equal to about 1,000 nm (e.g., from about 20 to about 500 nm). Nano-sized particles of metal oxides containing bismuth(V) can be prepared, for example, by high-energy mechanical milling of larger size particles.

In embodiments including $LiPF_6$ in the electrolyte solution, cathode 58 and/or battery 50 contains a low amount of water as an impurity. Without wishing to be bound by theory, it is believed that in the presence of water, $LiPF_6$ can be hydrolyzed forming hydrofluoric acid, which tends to corrode components of battery 50 and also can react with the anode. By reducing the amount of water, for example, in cathode 58, the formation of hydrofluoric acid can be reduced, thereby enhancing the performance of battery 50. In some embodiments, cathode 58 includes less than about 2,000 ppm of water and more than 100 ppm of water. For example, cathode 58 can include less than about 1,500 ppm, 1,000 ppm, or 500 ppm of water. The amount of water in cathode 58 can be controlled, for example, by only exposing the cathode to dry environments, such as a dry box, and/or by heating the cathode material (e.g., at about 100° C. under vacuum). In some embodiments, the water content in battery 50 can be slightly higher than the water content of cathode 58, such as when the electrolyte contains a small amount of water as an impurity (e.g., a maximum of about 50 ppm). As used herein, the water content of cathode 58 can be determined experimentally by standard Karl Fisher titrimetry. For example, water content can be determined with a Mitsubishi moisture analyzer (such as Model CA-05 or CA-06) outfitted with a sample pyrolizing unit (Model VA-05 or VA-21) using a heating temperature of 110-115° C.

A portion or all of the pentavalent bismuth in the bismuth (V)—containing metal oxides can be substituted by one or more other pentavalent metals. Other pentavalent metals can include $Sb^{+5}$, $Nb^{+5}$, $Ta^{+5}$, and/or $V^{+5}$. Pentavalent metal oxides and pentavalent bismuth-containing metal oxides can form solid solutions having rutile, trirutile, fluorite, pyrochlore, or perovskite-type structures or other related structures. The substituted metal oxides or solid solutions of metal oxides can be either p-type or n-type semiconductors. Examples of such materials can include $ZnBi_{2-x}Nb_xO_6$ and $ZnBi_{2-x}Sb_xO_6$, and $MgBi_{2-x}Ta_xO_6$, where x=0<x<2. Trivalent bismuth may also be present in such materials as a minor constituent.

The following examples are illustrative and not intended to be limiting.

EXAMPLE 1

Preparation of hexagonal silver bismuthate, $AgBiO_3$: Five (5.00) g of sodium bismuthate hydrate ($NaBiO_3 \cdot 1.37H_2O$, Aldrich, ACS Reagent grade) and 100 ml of a 0.5 M silver nitrate ($AgNO_3$, Alfa-Aesar, ACS Reagent grade) solution were mixed and sealed in a PTFE-lined 125 ml pressure vessel. The pressure vessel was heated to about 80° C. and held at that temperature for 22 hours. The pressure vessel was cooled to room temperature before opening.

A solid was separated from the solution by vacuum filtration and washed with several portions of de-ionized water. The solid was washed further by dispersing it in 1500 ml of de-ionized water, stirring for 30 minutes, and collecting the solid by vacuum filtration. The washing process was repeated twice. The washed solid was dried in air at room temperature, heated at about 95-105° C. for 4 hours in vacuo, and then at about 80° C. for 16 hours to yield a black powder. The powder was stored in an amber bottle to protect it from decomposition by exposure to light.

The powder was characterized using X-ray powder diffraction, chemical analysis, and thermal analysis. The X-ray powder diffraction pattern was consistent with that reported for hexagonal silver bismuthate having an ilmenite-type crystal structure. The lattice parameters were refined in the rhombohedral space group $R\bar{3}$. The lattice parameters (a=5.6353(6) Å and c=16.094(2) Å) corresponded well to the reported values (a=5.641(1) Å and c=16.118(2) Å). The calculated crystallographic density, $d_x$=8.21 g/cm$^3$ agreed well with the reported crystallographic density, $d_x$=8.18 g/cm$^3$. The Ag:Bi atom ratio of 1.02:1.00 was determined by ICP spectroscopy and is consistent with an ilmenite-type structure. Thermal analysis of hexagonal $AgBiO_3$ by DTA/TGA using a heating rate of 10° C./min to 550° C. in flowing air revealed weight loss starting below about 200° C. corresponding to decomposition of hexagonal $AgBiO_3$ to Ag metal and $Bi_2O_3$ accompanied by loss of oxygen. The total experimental weight loss of 6.68 weight percent was consistent with the calculated weight loss of 6.58 weight percent.

Electrochemical discharge performance of hexagonal $AgBiO_3$ was evaluated in type CR2430 stainless-steel coin cells. The coin cells are described below in detail and are depicted schematically in FIG. 1. Maximum overall dimensions specified by NEDA/ANSI for type CR2430 cells (i.e., 5011LC-type) are 24.50 mm in diameter and 3.00 mm in height. Nominal total internal cell volume is about 1.41 cm$^3$. Cells were assembled inside an argon-filled glovebox. The positive electrode was assembled in a multi-step process. Referring to FIG. 1, in a first step, a conductive base or stage layer 52 was formed by pressing about 0.6 g of a conductive mixture containing 75 wt % graphite (e.g., Timcal KS-6) and 25 wt % PTFE binder (e.g., Dupont T-60) into expanded grid 54 (e.g., Ex-met) fabricated from 316L stainless-steel wire having a weight of about 0.024 g/cm$^3$ that was spot welded to the inside surface of bottom cell housing 56. A homogeneous cathode mixture containing 70 wt % hexagonal $AgBiO_3$, 27 wt % graphite (e.g., Timcal KS-6), and 3 wt % PTFE binder (e.g., Dupont T-60) was prepared using an electric laboratory blender. Approximately 140-145 mg of the cathode mixture was pressed to form a thin layer of cathode 58 on top of conductive base layer 52. The positive electrode assembly was dried overnight in vacuo at 70° C. Anode 60 was fabricated by pressing a circular disk of lithium metal punched from 1 mm thick lithium foil (e.g., Cypress-Foote Industries, "battery-grade") into an expanded 316L stainless-steel grid (e.g., Ex-met) spot welded to the inside bottom surface of upper cell housing 62. A slight excess of lithium foil was used to compensate for void volume in the cell. A polymeric seal 64 (e.g., a gasket or grommet) was attached to upper cell housing 62. An electrolyte solution consisting of a 1.0 M solution of lithium hexafluorophosphate, $LiPF_6$, (e.g., Ferro Corp.) dissolved in a mixture of dry ethylene carbonate and diethylcarbonate in a volume ratio of 1:1 was added to the positive electrode assembly under vacuum. A circular piece of microporous polypropylene membrane separator 66 about 0.25 mm thick and having a mass of between 13.5 and 16.5 g/cm$^2$ (e.g., Celgard 2300) was placed centered on top of cathode mixture 58. A circular piece of a non-woven polyethylene sheet (not shown) saturated with electrolyte was placed on top lithium anode 60 between the lithium anode and separator 66. Additional electrolyte was added to fill bottom cell housing 56. Upper cell housing 62 and seal 64 were inserted into bottom cell housing 56 and battery 50 hermetically sealed by mechanical crimping.

Figure 2:
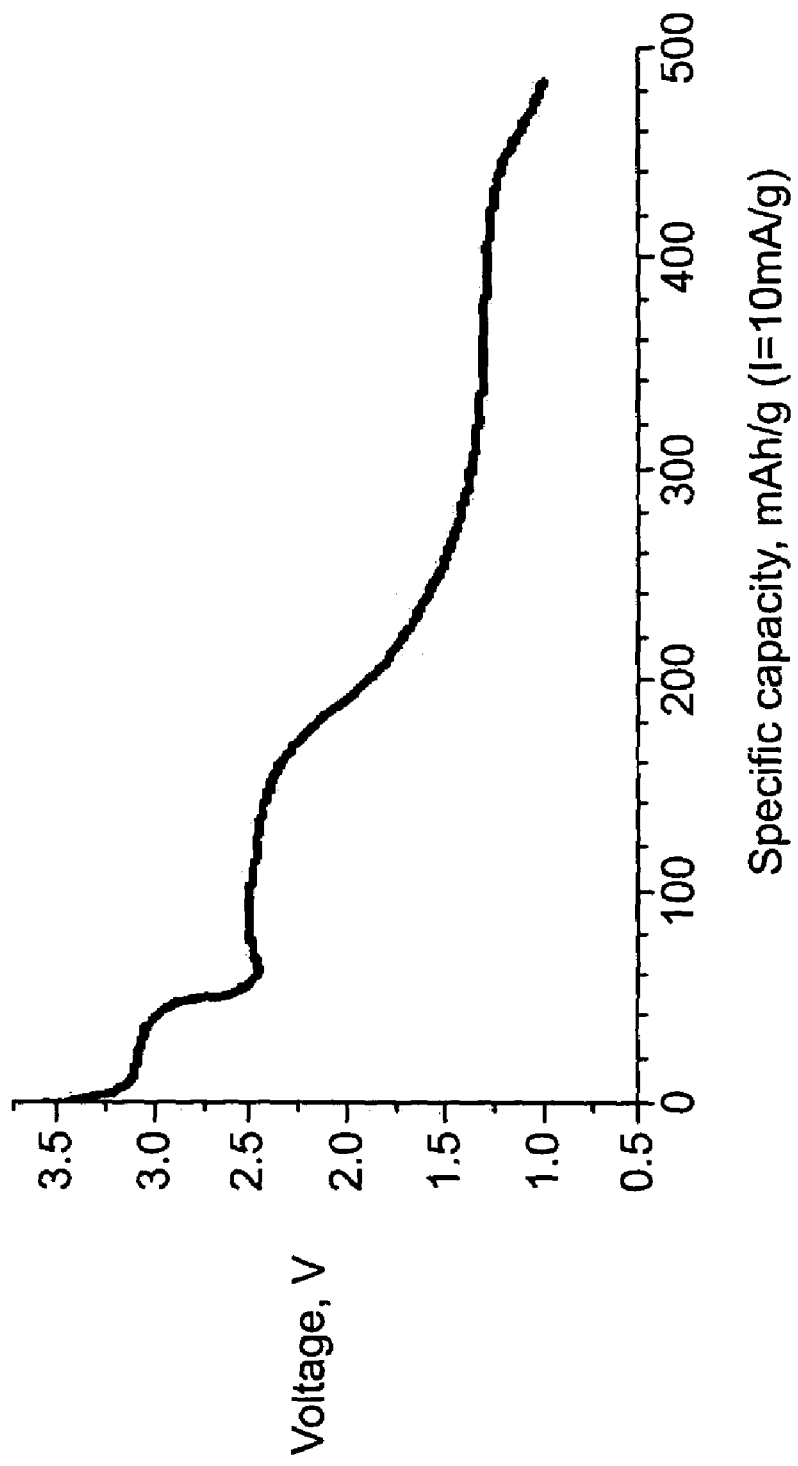
FIG. 2 is a discharge curve of a coin cell having a cathode including $AgBiO_3$ (hexagonal phase) discharged at a constant rate of nominally 10 mA/g to a 1 V cutoff voltage.

Cells were stored typically for 24 hours at room temperature to ensure complete wetting of electrodes and separators before being discharged at a constant rate of 10 mA/g of active material (i.e., C/30) to a 1 V cutoff voltage. The open circuit voltage (OCV) of cells containing hexagonal $AgBiO_3$ before discharge was about 3.5 V. Referring to FIG. 2, two distinct voltage plateaus were present in the discharge curve. Nominal average running voltages for the upper and lower plateaus were about 3.2 V and 2.4 V, respectively. Total specific capacity to a 2 V cutoff was about 195 mAh/g, which corresponds to about 86 percent of the theoretical three-electron capacity of 220 mAh/g.

The discharge reaction for a cell having a cathode including a metal oxide containing pentavalent bismuth and a lithium metal anode is believed to proceed via a multi-step process that includes a lithium ion insertion step and a subsequent decomposition step. For example, the voltage profile of a lithium cell having a cathode containing hexagonal $AgBiO_3$ discharged at a low drain rate (e.g., 10 mA/g) includes three distinct voltage plateaus between about 3.5 V and 1.0 V, as shown in FIG. 2. Without being bound by theory, the initial discharge process taking place on the 3.2 V plateau is thought to include the partial reduction of Bi(V) to Bi(III) with the simultaneous insertion of lithium ion to form an intermediate phase having the nominal composition $LiAgBiO_3$ as in Eq. 1. An analogous mixed-valence Bi(V)-Bi(III) cubic silver bismuthate phase having the nominal composition $Ag_2BiO_3$ has been reported in M. Jansen et al., *Z. Anorg. Allg. Chem.*, 628, 1951 (2002) and *J. Solid State Chem.*, 147, 117 (1999). Reduction of the remaining Bi(V) in $LiAgBiO_3$ to Bi(III) is thought to take place on the 2.45 V plateau resulting in the formation of bismuth sesquioxide, $Bi_2O_3$, and $Li_2O$ and is accompanied also by reduction of Ag(I) to Ag metal as summarized in Eq. 2. In support of this proposed discharge reaction, the reduction of Bi(V) to Bi(III) in nonaqueous primary lithium cells having cathodes including $LiBiO_3$ was found to take place at an average discharge voltage greater than about 2.9 V. Further, reduction of Ag(I) to Ag metal in nonaqueous primary lithium cells with $Ag_2CrO_4$ cathodes has been disclosed in U.S. Pat. Nos. 3,853,627 and 4,113,929 to occur at an average voltage less than about 2.95 V. The Cr in $Ag_2CrO_4$ is hexavalent. Similarly, reduction of Ag(I) to Ag metal in nonaqueous primary lithium cells having $Ag_2V_4O_{11}$ cathodes has been reported by E. S. Takeuchi and W. C.

Thiebolt in *J. Electrochem. Soc.*, 135, 2691 (1988) to occur at an average discharge voltage of about 2.8 V. In addition, the reduction of Ag(I) to Ag metal in nonaqueous primary lithium cells with $AgV_3O_8$ cathodes has been disclosed in U.S. Patent Application Publication 2004/0048156 to occur at an average voltage of about 2.65 V. The V in both $Ag_2V_4O_{11}$ and $AgV_3O_8$ is pentavalent. However, reduction of Ag(II) to Ag metal in thermally-stabilized AgO cathodes in nonaqueous primary lithium cells was disclosed in U.S. Pat. No. 5,658,688 to occur at a somewhat lower average voltage of about 2.4-2.5 V at low to moderate drain rates. Finally, the Bi(III) of $Bi_2O_3$ can be reduced completely to bismuth metal as shown in Eq. 3. This process is thought to take place on the third plateau at about 1.4 to 1.6 V.

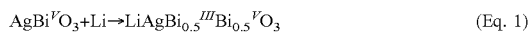  (Eq. 1)

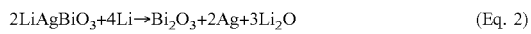  (Eq. 2)

  (Eq. 3)

TABLE 1

Comparison of Theoretical Volumetric Capacities and Theoretical Energy Densities (total cell) for lithium cells with cathodes containing complex $Bi^{+5}$ metal oxides.

| Active Cathode Material | No. e⁻ per formula unit | Theoret. Specific Capacity (mAh/g) | Ave CCV (V) | Density (g/cm³) | Theoret. Volumetric Capacity (cathode) (Ah/cm³) | Theoret. Energy Density (total cell) (Wh/L) |
|---|---|---|---|---|---|---|
| $AgBiO_3$ | 3 | 220 | 2.6 | 8.2 | 1.81 | 2510 |
| $LiBiO_3$ | 2 | 203 | 2.25 | 7.56 | 1.54 | 1999 |
| $KBiO_3$ | 2 | 181 | 2.1 | 5.87 | 1.06 | 1480 |
| $NaBiO_3$ | 2 | 191 | 2.1 | 6.5 | 1.24 | 1640 |
| $MgBi_2O_6$ | 4 | 199 | 2.6 | 7.92 | 1.58 | 2330 |
| $ZnBi_2O_6$ | 4 | 185 | 2.6 | 8.44 | 1.56 | 2310 |
| $Bi_2O_5$ | 4 | 215 | 1.7 | 5.1 | 1.10 | 1220 |
| $Bi_2O_4 \cdot 2H_2O$ | 2 | 103 | 1.6 | 5.6 | 0.58 | 730 |

TABLE 2

Specific capacities of coin cells with cathodes containing uncoated and CoOOH-coated bismuth(V)-containing metal oxides discharged to 2.0 V or 1.5 V cutoffs.

| Ex. No. | Cathode Material | Low-rate Capacity (2.0 V) (mAh/g) | % Utiliz | Low-rate Capacity (1.5 V) (mAh/g) | % Utiliz | High-rate Capacity (2.0 V) (mAh/g) | % Utiliz | High-rate Capacity (1.5 V) (mAh/g) | % Utiliz |
|---|---|---|---|---|---|---|---|---|---|
| 1 | h-$AgBiO_3$ | 195 | 86 | 250 | 114 | ND | ND | ND | ND |
| 2 | c-$AgBiO_3$ | 195 | 86 | 250 | 114 | ND | ND | ND | ND |
| 3 | $LiBiO_3$ | 45 | 22 | 97 | 48 | ND | ND | ND | ND |
| 4 | Co-ctd $ZnBi_2O_6$ | 50 | 27 | 200 | 108 | 30 | 16 | 40 | 22 |
| 5 | Co-ctd $MgBi_2O_6$ | 25 | 13 | 100 | 50 | ND | ND | ND | ND |
| 6 | $NaBiO_3$ | 45 | 26 | 50 | 28 | ND | ND | ND | ND |
| 7 | $Bi_2O_3$ | 0 | | 220 | 64 | 0 | 0 | 0 | 0 |
| 8 | $BiVO_4$ | 0 | 0 | 270 | 82 | 0 | 0 | 160 | 48 |

ND = no data

The observed ratio of relative specific capacities for the three voltage plateaus is approximately 1:3:7, for the 3.2 V, 2.45 V, and 1.5 V plateaus, respectively. The theoretical specific capacity for hexagonal $AgBiO_3$ assuming a two-electron reduction of Bi(V) to Bi(III) and a one-electron reduction of Ag(I) to Ag metal was calculated as 220 mAh/g as given in Table 1. The typical observed average specific capacity for lithium cells having cathodes containing hexagonal $AgBiO_3$ discharged at a low drain rate (e.g., 10 mA/g) to a 2 V cutoff voltage was nearly 200 mAh/g as given in Table 2. The theoretical specific capacity for $Bi_2O_3$ assuming a three-electron reduction of each Bi(III) to bismuth metal was calculated as 345 mAh/g. Thus, the total theoretical specific capacity for discharge of hexagonal $AgBiO_3$ to Ag and Bi metals is about 565 mAh/g. The observed average specific capacity for the lithium cells with cathodes containing hexagonal $AgBiO_3$ discharged at low drain rate (e.g., 10 mA/g) between 2 V and 1 V was about 310 mAh/g as shown in FIG. 2. Thus, the total observed low rate discharge capacity for lithium cells with cathodes containing hexagonal $AgBiO_3$ was about 510 mAh/g.

EXAMPLE 2

Preparation of cubic silver bismuthate, $AgBiO_3$: Silver bismuthate having a cubic lattice structure can be prepared by treating hydrated potassium bismuthate, $KBiO_3 \cdot xH_2O$, with an aqueous solution of silver nitrate, $AgNO_3$, at room temperature. Potassium bismuthate was prepared by adding $NaBiO_3 \cdot xH_2O$ to an oxidizing KOH melt and heating in air. A mixture of 125 g of KOH (Fisher, ACS Reagent) and 5.0 g of potassium superoxide, $KO_2$ (Alfa Aesar, 96.5%) was placed in a 125 ml Teflon beaker and heated to 250° C. in air to form a melt. In a single portion, 30 g of $NaBiO_3 \cdot 1.4H_2O$ (Mallinckrodt, 85%) was added to the melt and the mixture held at 250° C. for 1 hour. The melt was quenched quickly by pouring it into about 2 liters of room temperature de-ionized water. A brick red solid precipitated and was collected by suction filtration. The wet filter cake was re-suspended in about 2 liters of de-ionized water, stirred for 1 hour, collected by suction filtration, and washed thoroughly. The resulting brick red solid was dried in air at 60° C. for 24 hours.

The dried solid was characterized by X-ray powder diffraction and thermal analysis. The X-ray powder diffraction pattern was consistent with that reported, for example, in J. Trehoux et al., *Mat. Res. Bull.*, 17, 1235-1243(1982) for hydrated potassium bismuthate, $KBiO_3 \cdot xH_2O$ having a cubic $KSbO_3$-type structure (e.g., JCPDS #46-0806). Thermal analysis of the dried solid by TGA/DTA using a heating rate of 10° C./min to 600° C. in flowing air gave a weight loss below 250° C. that can be attributed to loss of water of hydration (e.g., 0.6 weight percent corresponding to x=0.1) and decomposition of $KBiO_3$ to $K_2O$ and $Bi_2O_3$ accompanied by oxygen loss. The total experimental weight loss of 5.4 weight percent is consistent with the calculated weight loss of 5.8 weight percent based on anhydrous $KBiO_3$.

Four (4.00) g of $KBiO_3$ was added to 100 ml of 0.25 M $AgNO_3$ aqueous solution (Aldrich, 1.0 N standardized) and stirred at room temperature for about 24 hours. A black solid precipitated and was collected by suction filtration, washed thoroughly with de-ionized water, and dried at 60° C. in air for 24 hours. The dried black solid was stored in an amber vial to protect it from decomposition by exposure to light.

The dried black solid was characterized by X-ray powder diffraction and thermal analysis. The X-ray powder diffraction pattern was consistent with that reported in R. Sharma et al., *Indian J. Chem.*, 43A, 11 (2004) for silver bismuthate having a cubic $KSbO_3$-type structure. The cubic $AgBiO_3$ phase is isotypic with $KBiO_3$. The characteristic X-ray diffraction lines of $KBiO_3$ shifted to higher 2Θ diffraction angles and are consistent with a contraction of the unit cell volume that can be attributed to the exchange of $K^+$ ions (1.38 Å) by smaller $Ag^+$ ions (1.15 Å). Thermal analysis (e.g., TGA/DTA) of cubic $AgBiO_3$ at a heating rate 10° C./min to 600° C. in flowing air revealed an exothermic peak at about 200° C. that can be attributed to the transition from the cubic to hexagonal phase. Weight loss below 300° C. can be attributed to decomposition of the cubic $AgBiO_3$ phase to an intermediate ternary Ag/Bi(III)/O phase and finally to Ag metal and $Bi_2O_3$ accompanied by oxygen loss, as determined by X-ray diffraction analysis. The total experimental weight loss of 6.24 weight percent is consistent with the calculated weight loss of 6.58 weight percent.

The electrochemical discharge performance of the cubic $AgBiO_3$ was evaluated in type CR2430 stainless-steel coin cells that were fabricated in the same manner as described for hexagonal $AgBiO_3$ of Example 1. Cells were stored typically for 24 hours at room temperature before discharge at a constant rate of 10 mA/g (C/30) to a final cutoff voltage of 1 V. The OCV before discharge was about 3.5 V. The total specific capacity to a 2 V cutoff voltage was about 195 mAh/g, which corresponds to about 86 percent of the theoretical 3-electron capacity of about 220 mAh/g. The total specific capacity to a 1.5 V cutoff voltage was about 250 mAh/g.

Figure 3:
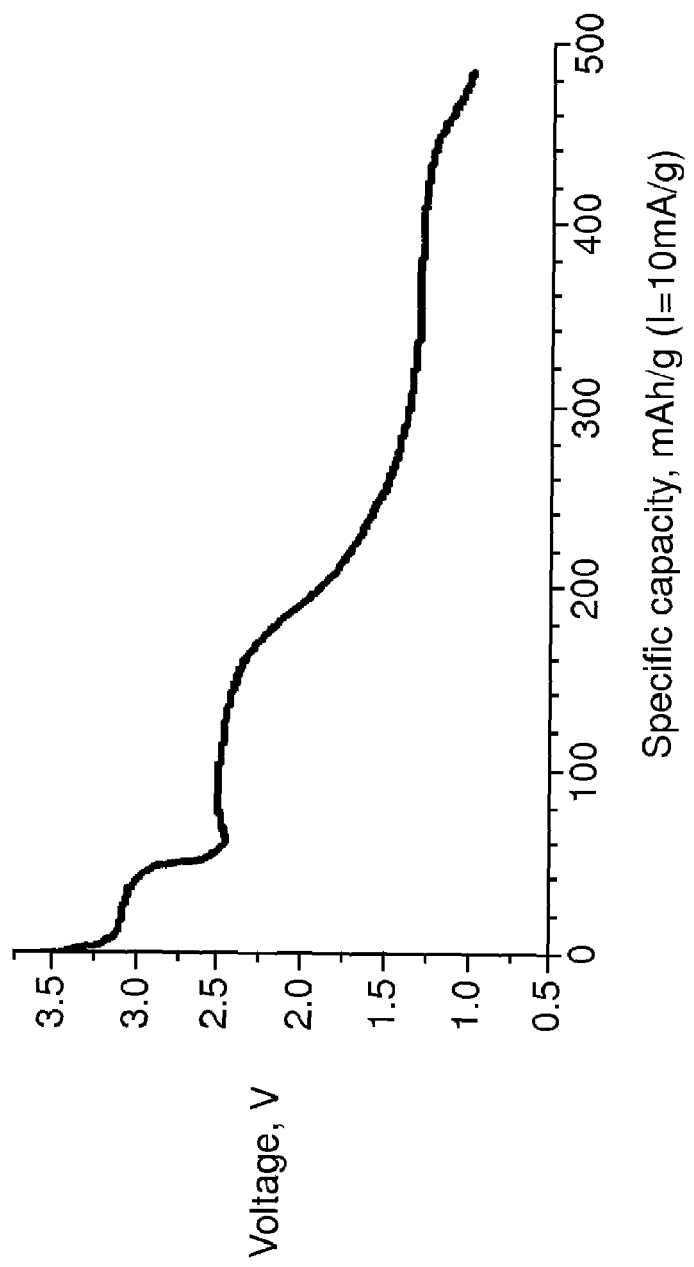
FIG. 3 is a discharge curve of a coin cell having a cathode including $AgBiO_3$ (cubic phase) discharged at a constant rate of nominally 10 mA/g to a 1 V cutoff voltage.

The voltage discharge profile of a lithium cell with a cathode containing cubic $AgBiO_3$ also has three voltage plateaus between 3.5 V and 1 V when discharged at low drain rate (e.g., 10 mA/g) as shown in FIG. 3. However, the upper voltage plateau is about 100 mV lower than that for the hexagonal $AgBiO_3$ (i.e., about 3.08 V) but has the same capacity. The second voltage plateau appears at nearly the same voltage (i.e., about 2.5 V) with the same capacity as that of hexagonal $AgBiO_3$. The lowest plateau has both the same average voltage (i.e., about 1.4 V) and capacity as that of the lowest plateau of hexagonal $AgBiO_3$. Thus, without being bound by theory, the initial discharge process on the 3.1 V plateau is thought to also include partial reduction of Bi(V) to Bi(III) with simultaneous lithium ion insertion to form the same $LiAgBiO_3$ intermediate phase as with cubic $AgBiO_3$ as summarized in Eq. 1. The subsequent discharge reactions on the lower voltage plateaus are thought to be identical to those for hexagonal $AgBiO_3$.

EXAMPLE 3

Preparation of lithium bismuthate, $LiBiO_3$: About four grams (4.07 g) of sodium bismuthate hydrate ($NaBiO_3 \cdot 1.4H_2O$, Mallinckrodt, ≧80% purity) was added to a solution of 2.4 g lithium hydroxide ($LiOH \cdot H_2O$, Alfa Aesar, Technical) in 70 ml deionized water, and the resulting mixture was sealed in a PTFE-lined 125 ml pressure vessel. The pressure vessel was heated to and held at 120° C. for 6 days. The pressure vessel was cooled to room temperature before opening.

A solid was separated from the reaction mixture by vacuum filtration. The solid was washed with several portions of de-ionized water, collected by vacuum filtration, and dried at about 60° C. for 24 hours in air to yield a dark purple powder.

The solid was characterized using X-ray powder diffraction, chemical analysis, and thermal analysis. The X-ray powder diffraction pattern for the solid was consistent with that reported for lithium bismuthate, $LiBiO_3$, having an ilmenite-type structure. No residual sodium was detected by SEMIEDS analysis of the powder, suggesting nearly complete ion-exchange of sodium by lithium. Thermal analysis of the solid using DTA/TGA at a heating rate of 10° C./min to 600° C. in flowing air revealed a three step weight loss starting at about 300° C. corresponding to consecutive loss of oxygen. The experimentally observed total weight loss of 6.1 weight percent at 550° C. agrees well with the calculated weight loss of 6.1 weight percent corresponding to the reduction of $LiBiO_3$ to $LiBiO_2$ or alternatively, to a mixture of $Li_2O$ and $Bi_2O_3$.

The electrochemical discharge performance of the $LiBiO_3$ was evaluated in type CR2430 stainless-steel coin cells fabricated in the same manner as described for the hexagonal $AgBiO_3$ of Example 1. Cells were stored typically for 24 hours at room temperature before discharge at a constant drain rate of 10 mA/g (i.e., C/30) to a final cutoff voltage of 1 V. The average OCV before discharge was about 3.4 V. The total specific capacity to a 2 V cutoff voltage was about 50 mAh/g, which corresponds to about 25 percent of the theoretical 2-electron capacity of about 203 mAh/g. The total specific capacity to a 1.5 V cutoff voltage was about 97 mAh/g, which corresponds to about 48 percent of the theoretical two-electron capacity.

Figure 4:
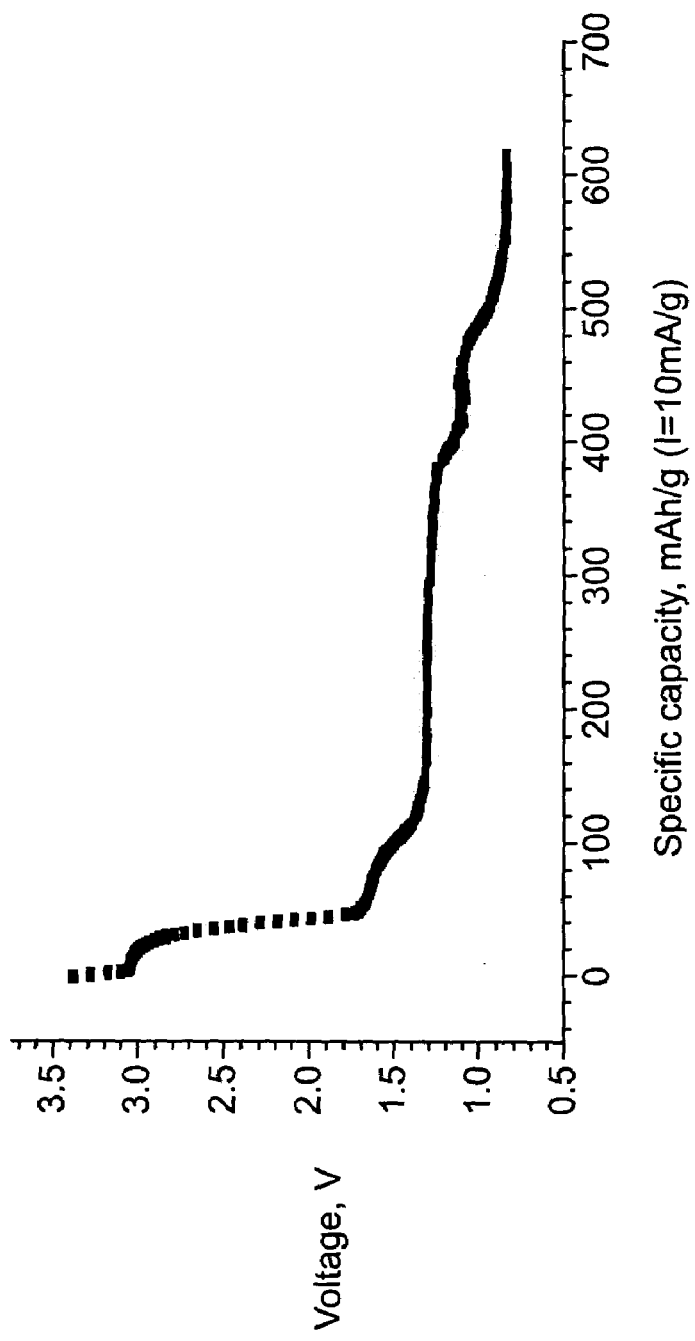
FIG. 4 is a discharge curve of a coin cell having a cathode including $LiBiO_3$ discharged at a constant rate of nominally 10 mA/g to a 1 V cutoff voltage.

The voltage discharge profile of a lithium cell with a cathode containing cubic $LiBiO_3$ also has three voltage plateaus between 3.5 V and 1 V when discharged at low drain rate (e.g., 10 mA/g) as shown in FIG. 4. The upper voltage plateau appears at a somewhat lower voltage (i.e., about 2.9 V) than that for either $AgBiO_3$ phase but has comparable capacity. The second voltage plateau appears at a much lower voltage (i.e., about 1.6 V) and has only about 37% of the capacity of the second voltage plateau of $AgBiO_3$. The lowest plateau has comparable voltage (i.e., about 1.5 V) and capacity to that of $AgBiO_3$. Thus, it can be hypothesized that the initial discharge process of $LiBiO_3$ taking place on the 2.9 V plateau can include the partial reduction of Bi(V) to Bi(III) accompanied by simultaneous insertion of lithium ion to form a mixed-valence phase having the nominal composition $Li_2Bi^{III}_{0.5}Bi^{V}_{0.5}O_3$ as shown in Eq. 4. Reduction of the remaining Bi(V) to Bi(III) is thought to take place on the 1.6 V plateau forming $Bi_2O_3$ and $Li_2O$ as shown in Eq. 5. Finally, reduction of the Bi(III) in $Bi_2O_3$ to bismuth metal can take place on the 1.5 V plateau as described in Eq. 6.

$$LiBiO_3 + Li \rightarrow Li_2Bi^{III}_{0.5}Bi^{V}_{0.5}O_3 \quad (Eq.\ 4)$$

$$2Li_2BiO_3 + 2Li \rightarrow Bi_2O_3 + 3Li_2O \quad (Eq.\ 5)$$

$$Bi_2O_3 + 6Li \rightarrow 2Bi + 3Li_2O \quad (Eq.\ 6)$$

EXAMPLE 4

Preparation of zinc bismuthate, $ZnBi_2O_6$: Five (5.00) grams of sodium bismuthate hydrate ($NaBiO_3 \cdot 1.15H_2O$, Fluka, Germany, $\geq 85\%$ purity) and 50 ml of a 0.398 M zinc nitrate ($Zn(NO_3)_2 \cdot 6H_2O$, Alfa-Aesar, 99%) aqueous solution were mixed with an additional 20 ml deionized water and sealed in a PTFE-lined 125 ml pressure vessel. The pressure vessel was heated to and held at 95° C. for 4.5 days. The pressure vessel was cooled to room temperature before opening.

A solid was separated from the liquid by vacuum filtration. The solid was washed by dispersing in 400 ml de-ionized water, stirring, and collecting the solid by centrifugation. The washing process was repeated three times. The washed solid was dried at 90° C. for 3 hours in vacuo to yield a reddish brown powder.

The powder was characterized using X-ray powder diffraction, chemical analysis, and thermal analysis. The X-ray powder diffraction pattern of the powder was consistent with that reported for trirutile $ZnBi_2O_6$. The lattice parameters were refined in the tetragonal space group P42/mnm. The calculated values (a=4.8437(4) Å and c=9.7420(1) Å) corresponded well with the reported values (a=4.8386(1) Å and c=9.7422(3) Å). The calculated crystallographic density, $d_x$=8.44 g/cm$^3$ agreed well with the reported experimental specific gravity of 8.36 g/cm$^3$. The Zn:Bi atom ratio of 1.05:2.00, determined by inductively-coupled plasma (ICP) spectroscopy, was consistent with that for a trirutile structure. Thermal analysis of $ZnBi_2O_6$ by differential thermal analysis and thermogravimetric analysis (e.g., DTA/TGA) at a heating rate of 10° C./min to 550° C. in flowing air revealed a weight loss that started below about 300° C., which is thought to correspond to the decomposition of $ZnBi_2O_6$ to ZnO and $Bi_2O_3$ accompanied by oxygen loss. The experimentally observed weight loss of 5.6 weight percent corresponded closely to the calculated weight loss of 5.52 weight percent.

To increase the electrical conductivity of a cathode formed with the $ZnBi_2O_6$ powder, a thin coating of cobalt oxyhydroxide, CoOOH was deposited onto the surface of the $ZnBi_2O_6$ particles. A solution containing 0.272 g cobalt sulfate hydrate ($CoSO_4 \cdot 6.9H_2O$, Alfa-Aesar) dissolved in 20 ml of de-ionized water was added with stirring to a 500 ml flask containing a solution of 9.12 g ammonium peroxydisulfate, $(NH_4)_2S_2O_8$ (Alfa-Aesar, $\geq 98\%$) dissolved in 100 ml of de-ionized water and heated to 77° C. A slurry containing 9.765 g $ZnBi_2O_6$ powder mixed with a small amount of de-ionized water was added with vigorous stirring to the heated solution containing the $CoSO_4 \cdot 6.9H_2O$ and $(NH_4)_2S_2O_8$. After stirring for 10 minutes at 77° C., 30 ml of 0.766M $NH_4OH$ solution was added to increase the pH of the mixture (e.g., $\geq 14$). The stirred mixture was held at 77° C. for another hour and then allowed to cool to room temperature. A dark brown solid was separated by vacuum filtration, washed, and dried in vacuo at 60° C. for about 2 hours.

The electrochemical discharge performance of the CoOOH-coated $ZnBi_2O_6$ was evaluated in type CR2430 stainless-steel coin cells in the same manner as described for the hexagonal $AgBiO_3$ of Example 1. Cells were discharged at a constant drain rate of 10 mA/g (i.e., C/30) to a final cutoff voltage of 1 V after storage for 24 hours at room temperature. The OCV before discharge was about 3.4 V. The total specific capacity to a 2 V cutoff voltage was about 50 mAh/g, which corresponds to about 27 percent of the theoretical two-electron capacity of about 185 mAh/g. The total specific capacity to a 1.5 V cutoff voltage was about 200 mAh/g.

Figure 5:
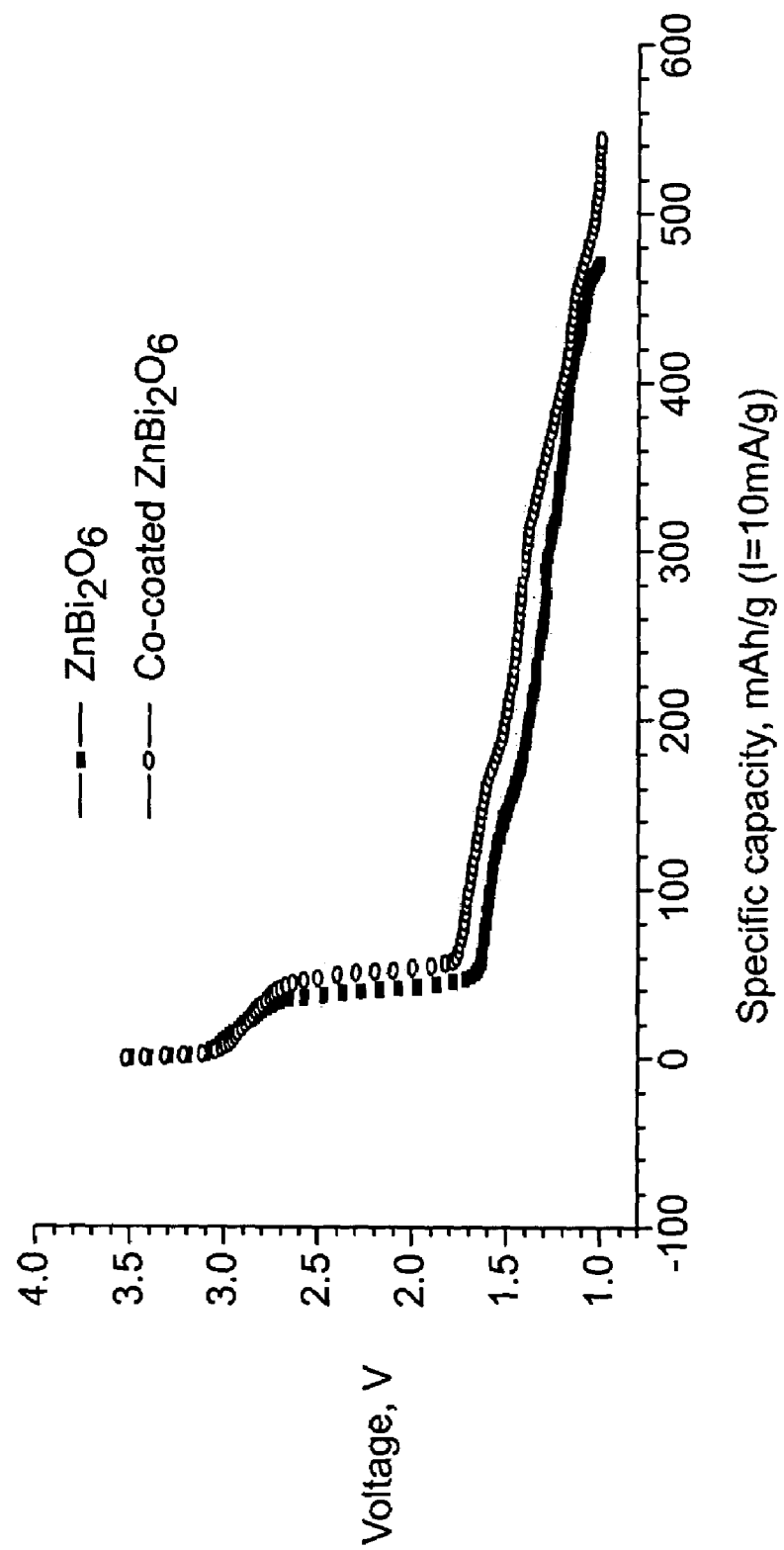
FIG. 5 depicts discharge curves of coin cells having cathodes including $ZnBi_2O_6$ (square symbol) or CoOOH-coated $ZnBi_2O_6$ (oval symbol) both discharged at a constant rate of nominally 10 mA/g to a 1 V cutoff voltage.

The voltage profile of a cell with a cathode containing CoOOH-coated $ZnBi_2O_6$ discharged at a low drain rate (e.g., 10 mA/g) has two distinct voltage plateaus between 3.5 V and 1 V as shown in FIG. 5. The relatively short upper plateau at about 2.8 V in the voltage profile is hypothesized to correspond to the partial reduction of Bi(V) to Bi(III) in $ZnBi_2O_6$ accompanied by lithium insertion to form a mixed-valence Bi(V)-Bi(III) phase having the nominal composition $LiZn_{0.5}Bi^{III}_{0.5}Bi^{V}_{0.5}O_3$ as shown in Eq. 7. Reduction of the remaining Bi(V) to Bi(III) accompanied by decomposition of the trirutile phase to form $Bi_2O_3$, ZnO, and $Li_2O$ is thought to take place on the second plateau between about 1.5 and 1.7 V as shown in Eq. 8. The sloping voltage plateau extending below about 1.5 V, can be attributed to reduction of Bi(III) in $Bi_2O_3$ to Bi metal as shown in Eq. 9.

$$ZnBi_2O_6 + 2Li \rightarrow 2LiZn_{0.5}Bi^{III}_{0.5}Bi^{V}_{0.5}O_3 \quad (Eq.\ 7)$$

$$2LiZn_{0.5}BiO_3 + 2Li \rightarrow Bi_2O_3 + ZnO + 2Li_2O \quad (Eq.\ 8)$$

$$Bi_2O_3 + 6Li \rightarrow Bi + 3Li_2O \quad (Eq.\ 9)$$

Cells with cathodes containing uncoated $ZnBi_2O_6$ exhibited somewhat less capacity on the upper voltage plateau, having 90% of-the capacity of cells containing CoOOH-coated $ZnBi_2O_6$ to a 1.5 V cutoff. It is further hypothesized that the improved performance of cells containing CoOOH-coated $ZnBi_2O_6$ can be attributed to the greater electrical conductivity of the CoOOH coating. This is consistent with the observation, for example, in D. W. Murphy et al., *Mater. Res. Bull.*, 13 (12), 1395 (1978) that the ability to incorporate substantial amounts of lithium at moderate rates by metal oxides having rutile-related structures can be correlated with the electronic conductivity and the unit cell volume of the crystal lattice. It was hypothesized that high electronic conductivity in a metal oxide can provide efficient screening of coulombic repulsion between lithium ions inserted in the lattice, thereby reducing the minimum unit cell volume requirement for lithium ion incorporation and rapid lithium ion diffusion in the crystal lattice.

EXAMPLE 5

Preparation of magnesium bismuthate, $MgBi_2O_6$: Five (5.00) g of sodium bismuthate hydrate ($NaBiO_3 \cdot 1.37H_2O$, Aldrich, ACS reagent) and 13.35 g magnesium chloride hexahydrate ($MgCl_2 \cdot 6H_2O$, Alfa-Aesar, 99-102%) were mixed with about 60 ml of de-ionized water and sealed in a PTFE-lined 125 ml pressure vessel. The pressure vessel and contents were heated to and held at 135° C. for 2.5 days. The pressure vessel was cooled to room temperature before opening.

A solid was separated from the liquid by vacuum filtration and washed with several portions of de-ionized water. The solid was washed further by dispersing it in about 1000 ml of de-ionized water, stirring for 30 minutes, and collecting the solid by vacuum filtration. The washing process was repeated. The washed solid was dried in air at room temperature, at about 60° C. for about 24 hours to yield a dark brown powder.

The powder was characterized using X-ray powder diffraction, chemical analysis, and thermal analysis. The X-ray powder diffraction pattern was consistent with that reported for trirutile $MgBi_2O_6$. The lattice parameters were refined in the tetragonal space group P42/mnm. The values obtained (a=4.82168(3) Å and c=9.71194(8) Å) corresponded closely to the reported values (a=4.8187(1) Å and c=9.7067(2) Å). The calculated crystallographic density, $d_x$=7.92 g/cm$^3$ was consistent with the experimental true density of 7.51 g/cm$^3$ determined by displacement of helium gas using a null-pycnometer (e.g., UOP Method 851-84). A Mg:Bi atom ratio of 1.02:2.00 was determined by ICP spectroscopy which is consistent with that expected for a trirutile structure. Thermal analysis of $MgBi_2O_6$ by DTA/TGA at a heating rate of 10° C./min to 550° C. revealed a loss in weight starting below about 400° C. in flowing air thought to correspond to the decomposition of $MgBi_2O_6$ to MgO and $Bi_2O_3$ accompanied by oxygen loss. The experimentally observed weight loss of 5.91 weight percent is consistent with the calculated weight loss of 5.94 weight percent.

The X-ray powder diffraction pattern of the washed and dried solid product also revealed the presence of small amounts of bismuth oxide, $Bi_2O_3$ and bismuth oxychloride, BiOCl in addition to $MgBi_2O_6$. Some BiOCl can be formed during hydrothermal synthesis of $MgBi_2O_6$. The $Bi_2O_3$ can be present as an impurity phase in the sodium bismuthate starting material and also can be formed during the hydrothermal synthesis of $MgBi_2O_6$. The solid product was treated with a stirred 9N KOH electrolyte solution saturated with about 2 wt % barium hydroxide for about 4 to 5 days at ambient room temperature to hydrolyze the BiOCl impurity. The purified solid was collected by vacuum filtration, washed with several portions of de-ionized water, and dried at about 60° C. for about 24 hours in air to yield a dark purple-brown powder. The X-ray powder diffraction pattern of the washed and dried purified solid revealed the absence of the diffraction peaks of BiOCl but the presence of very low intensity peaks corresponding to trace amounts of $Bi_2O_3$.

To increase the electrical conductivity of a cathode formed with the $MgBi_2O_6$ powder, a thin coating of cobalt oxyhydroxide, CoOOH was deposited onto the surface of the $MgBi_2O_6$ particles. A slurry containing 9.43 g $MgBi_2O_6$ powder mixed with a small amount of de-ionized water was added with stirring to 50 ml of aqueous 0.8 M ammonium peroxydisulfate, $(NH_4)_2S_2O_8$ (Alfa-Aesar, ≧98%) solution and heated at 74-76° C. in a 500 ml flask. A 20 ml aliquot of aqueous 0.175 M cobalt sulfate hydrate ($CoSO_4·6.9H_2O$, Alfa-Aesar) solution was added with stirring to the mixture of $MgBi_2O_6$ and ammonium peroxydisulfate. After stirring for about 15 minutes at 75° C., 40 ml of 5.0 M KOH solution was added to increase the pH of the mixture (e.g., ≧14), and stirring was continued for an additional 45 minutes. The mixture was allowed to cool to room temperature. A dark brown solid was separated by vacuum filtration, washed, and dried in vacuo at 90-115° C. for about 2 hours.

The electrochemical discharge performance of CoOOH-coated $MgBi_2O_6$ was evaluated in type CR2430 stainless-steel coin cells fabricated in the same manner as described for the hexagonal $AgBiO_3$ of Example 1. Cells were discharged at a constant drain rate of 10 mArg (i.e., C/30) to a final cutoff voltage of 1 V after storage for 24 hours at room temperature. The average OCV before discharge was about 3.4 V. The total specific capacity to a 2 V cutoff voltage was about 25 mAh/g, which corresponds to about 13 percent of the theoretical two-electron capacity of about 199 mAh/g. The total specific capacity to a 1.5 V cutoff voltage was about 100 mAh/g, which corresponds to about 50 percent of the theoretical two-electron capacity. The voltage profile of a cell with a cathode containing CoOOH-coated $MgBi_2O_6$ discharged at a low drain rate (e.g., 10 mA/g) has two distinct voltage plateaus between 3.5 V and 1 V similar to that of cells containing the CoOOH-coated $ZnBi_2O_6$ of Example 4. The relatively short upper plateau at about 2.6 V in the voltage profile is hypothesized to correspond to the partial reduction of Bi(V) to Bi(III) in $MgBi_2O_6$ accompanied by lithium insertion to form a mixed-valence Bi(V)-Bi(III) phase as in the case of $ZnBi_2O_6$. Similarly, reduction of the remaining Bi(V) to Bi(III) accompanied by decomposition of the trirutile phase to form $Bi_2O_3$, MgO, and $Li_2O$ is thought to take place on the lower plateau between about 1.4 and 1.7 V. The sloping voltage plateau below about 1.4 V can be attributed to reduction of Bi(III) in $Bi_2O_3$ to Bi metal.

EXAMPLE 6

Figure 6:
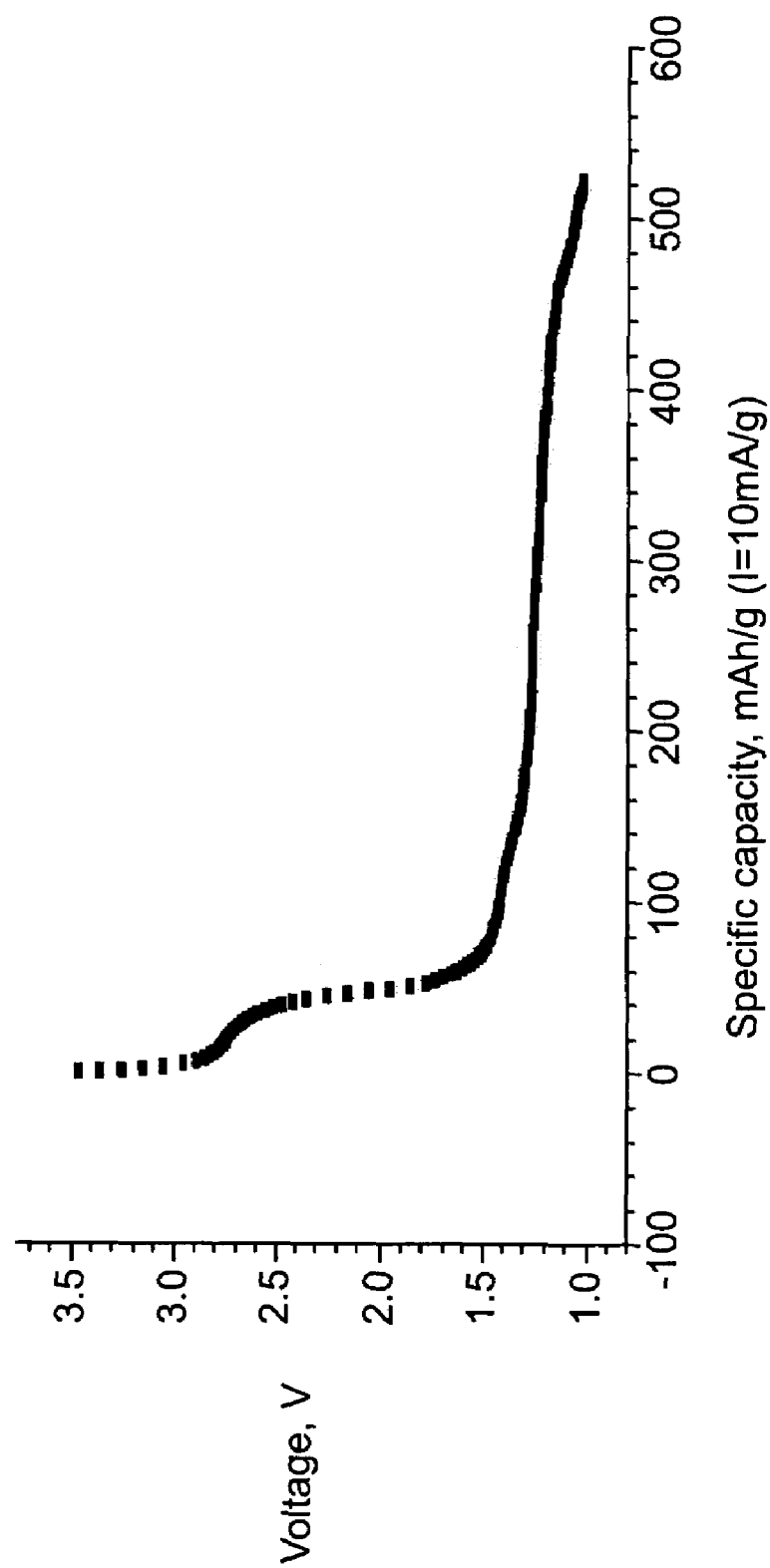
FIG. 6 is a discharge curve of a coin cell having a cathode including $NaBiO_3$ discharged at a constant rate of nominally 10 mA/g to a 1 V cutoff voltage.

Discharge of sodium bismuthate, $NaBiO_3$ in a lithium cell: The electrochemical discharge performance of sodium meta-bismuthate hydrate, $NaBiO_3·1.15H_2O$ (≧85%, Aldrich) was evaluated in type CR2430 stainless-steel coin cells in the same manner as described for the hexagonal $AgBiO_3$ of Example 1. The sodium bismuthate hydrate was dried at 70° C. for 24 hours to remove adsorbed water before preparation of the cathode mixture. Cells were discharged at a constant drain rate of 10 mA/g (i.e., C/30) to a final cutoff voltage of 1 V after storage for 24 hours at room temperature. The OCV before discharge was about 3.4 V. The total specific capacity to a 2 V cutoff voltage was about 45 mAh/g, which corresponds to about 26 percent of the theoretical two-electron capacity of about 176 mAh/g. Unlike the cells of Examples 1 and 2 containing $AgBiO_3$, only one voltage plateau was present in the low-rate discharge curve above 1.5 V as shown in FIG. 6. The nominal running voltage on the single plateau was about 2.7 V. The sloping voltage plateau below about 1.4 V can be attributed to reduction of Bi(III) in $Bi_2O_3$ to Bi metal.

EXAMPLE 7

Discharge of bismuth sesquioxide, $Bi_2O_3$ in a lithium cell: The electrochemical discharge performance of bismuth sesquioxide, $Bi_2O_3$ (Puratronic, 99.999%, Alfa Aesar) was evaluated in type CR2430 stainless-steel coin cells fabricated in the same manner as described for the hexagonal $AgBiO_3$ of Example 1. The $Bi_2O_3$ was dried at 70° C. for 24 hours to remove adsorbed water before preparation of the cathode mixture. Cells were discharged at a constant drain rate of 10 mA/g (i.e., C/30) to a cutoff voltage of 1 V after storage for 24 hours at room temperature. The OCV before discharge was about 2 V. Unlike the cells of Examples 1-5, these cells had no measurable capacity above 2 V. Between 2 V and 1 V, there were two voltage plateaus. Nominal running voltages for the upper and lower plateaus were about 1.65 V and 1.45 V, respectively. Total specific capacity to a 1.5 V cutoff voltage was about 220 mAh/g, which corresponds to about 64 percent of the theoretical six-electron capacity of about 345 mAh/g.

EXAMPLE 8

Discharge of bismuth vanadate, BiVO$_4$ in a lithium cell: The electrochemical discharge performance of bismuth vanadate, BiVO$_4$ (99.9%, Alfa Aesar) was evaluated in type CR2430 stainless-steel coin cells fabricated in the same manner as described for the hexagonal AgBiO$_3$ of Example 1. The BiVO$_4$ was dried at 180° C. for 12 hours to remove any adsorbed water before preparation of the cathode mixture. Cells were discharged at constant drain rates of 10 mA/g (i.e., C/30) and 100 mA/g (i.e., C/3) to a final cutoff voltage of 1 V after storage for 24 hours at room temperature. The OCV before discharge typically was about 3 V. Unlike the cells of Examples 1-5, these cells had no measurable capacity above a 2 V cutoff voltage. However, between 2 V and 1.5 V, there was a single voltage plateau in the low-rate discharge curve. The nominal running voltage of this plateau was about 1.85 V. The total specific capacity at low rate to a 1.5 V cutoff was about 270 mAh/g, which corresponds to the theoretical three-electron capacity of 250 mAh/g. The nominal running voltage of this plateau in the high-rate discharge curve was about 1.6 V. The total specific capacity at high rate to a 1.5 V cutoff voltage was about 160 mAh/g, which corresponds to about 64 percent of the theoretical three-electron capacity.

All references, such as patent applications, publications, and patents, referred to herein are incorporated by reference in their entirety.

Other embodiments are in the claims.

What is claimed is:

1. A lithium battery, comprising:
   a cathode comprising an oxide containing pentavalent bismuth and a metal other than pentavalent bismuth;
   an anode comprising lithium;
   a separator between the cathode and the anode; and
   an electrolyte including an organic solvent and a lithium salt.

2. The battery of claim 1, wherein the metal is an alkali metal.

3. The battery of claim 2, wherein the alkali metal is selected from the group consisting of lithium, sodium, and potassium.

4. The battery of claim 2, wherein the oxide is LiBiO$_3$, Li$_3$BiO$_4$, Li$_5$BiO$_5$, Li$_7$BiO$_6$, Li$_4$Bi$_2$O$_7$, Li$_5$Bi$_3$O$_{10}$ or KBiO$_3$.

5. The battery of claim 1, wherein the metal is an alkaline earth metal.

6. The battery of claim 5, wherein the alkaline earth metal is selected from the group consisting of magnesium, calcium, strontium, and barium.

7. The battery of claim 5, wherein the oxide is selected from the group consisting of MgBi$_2$O$_6$, SrBi$_2$O$_6$, Sr$_2$Bi$_2$O$_7$, LiSr$_3$BiO$_6$, NaSr$_3$BiO$_6$, Li$_2$Ba$_2$Bi$_2$O$_{11}$, and Ba$_2$Bi$_2$O$_6$.

8. The battery of claim 1, wherein the metal is a transition metal.

9. The battery of claim 8, wherein the transition metal is selected from the group consisting of scandium, vanadium, chromium, manganese, iron, cobalt, nickel, copper, zinc, silver, yttrium, zirconium, niobium, molybdenum, ruthenium, palladium, cadmium, hafnium, tantalum, and tungsten.

10. The battery of claim 8, wherein the oxide is ZnBi$_2$O$_6$, Cu$_2$Bi$_2$O$_7$, CdBi$_2$O$_6$, AgBiO$_3$, or Sr$_2$ScBiO$_6$.

11. The battery of claim 8, wherein the oxide further comprises an alkali metal or an alkaline earth metal.

12. The battery of claim 1, wherein the metal is a lanthanide.

13. The battery of claim 12, wherein the lanthanide is selected from the group consisting of lanthanum, cerium, praseodymium, neodymium, samarium, europium, gadolinium, terbium, dysprosium, holmium, erbium, thulium, and ytterbium.

14. The battery of claim 12, wherein the oxide further comprises an alkali metal or an alkaline earth metal.

15. The battery of claim 1, wherein the metal is a main group metal.

16. The battery of claim 15, wherein the main group metal is selected from the group consisting of gallium, indium, tin, arsenic, antimony, thallium, and lead.

17. The battery of claim 15, wherein the oxide further comprises an alkali metal or an alkaline earth metal.

18. The battery of claim 1, wherein the oxide comprises an electrically conductive portion.

19. The battery of claim 18, wherein the electrically conductive portion is an electrically conductive surface coating comprising carbon or a metal oxide.

20. The battery of claim 19, wherein the electrically conductive surface coating comprises a material selected from the group consisting of graphite, carbon black, acetylene black, cobalt oxide, cobalt oxyhydroxide, silver oxide, silver nickel oxide, and indium oxide.

21. The battery of claim 20 wherein the carbon black is a highly graphitized carbon black.

22. The battery of claim 1, wherein the cathode further comprises a second oxide that contains a metal and is free of pentavalent bismuth.

23. The battery of claim 22 wherein the second oxide is selected from NiOOH, AgO, Ag$_2$O, AgNiO$_2$, and BaFeO$_4$.

24. The battery of claim 22 wherein the cathode includes the second oxide in an amount corresponding to a weight fraction of from about one to about 50% based on the combined weight of the metal oxide containing pentavalent bismuth and the second oxide.

25. The battery of claim 1, wherein the anode comprises an alloy comprising lithium.

26. The battery of claim 1, wherein the electrolyte is non-aqueous.

27. The battery of claim 1, wherein the battery is a primary battery.

28. The battery of claim 1, wherein the battery is a secondary battery.

29. The battery of claim 1, wherein the pentavalent bismuth constitutes at least 50 atomic percent of the bismuth in the oxide.

30. The battery of claim 1, wherein the pentavalent bismuth constitutes at least 70 atomic percent of the bismuth in the oxide.

* * * * *

UNITED STATES PATENT AND TRADEMARK OFFICE
CERTIFICATE OF CORRECTION

| | |
|---|---|
| PATENT NO. | : 7,300,722 B2 |
| APPLICATION NO. | : 11/103050 |
| DATED | : November 27, 2007 |
| INVENTOR(S) | : Paul A. Christian et al. |

It is certified that error appears in the above-identified patent and that said Letters Patent is hereby corrected as shown below:

On the cover page, under "Other Publications", Liu et al., delete "Synethesis" and insert --Synthesis--.

On the cover page, under "Other Publications", Takeuchi et al., delete "Electrochechemical" and insert --Electrochemical--.

Signed and Sealed this

Twenty-first Day of October, 2008

JON W. DUDAS
*Director of the United States Patent and Trademark Office*